(12) United States Patent
Youn et al.

(10) Patent No.: US 12,384,049 B2
(45) Date of Patent: Aug. 12, 2025

(54) ROBOT FOR TRANSFERRING SUBSTRATE AND APPARATUS FOR TREATING SUBSTRATE

(71) Applicant: SEMES CO., LTD., Cheonan-si (KR)

(72) Inventors: Hee Jun Youn, Cheonan-si (KR); Jun Young Choi, Cheonan-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 237 days.

(21) Appl. No.: 18/343,774

(22) Filed: Jun. 29, 2023

(65) Prior Publication Data

US 2024/0217114 A1 Jul. 4, 2024

(30) Foreign Application Priority Data

Dec. 29, 2022 (KR) .................. 10-2022-0189831

(51) Int. Cl.
  *B25J 11/00* (2006.01)
  *B25J 15/00* (2006.01)
(52) U.S. Cl.
  CPC ........ *B25J 11/0095* (2013.01); *B25J 11/0085* (2013.01); *B25J 15/0028* (2013.01); *B25J 15/009* (2013.01)
(58) Field of Classification Search
  CPC .................................................. B25J 11/0095
  See application file for complete search history.

(56) References Cited

FOREIGN PATENT DOCUMENTS

| CN | 211017026 U | 7/2020 |
|---|---|---|
| JP | 5297144 B2 | 9/2013 |
| KR | 10-2013-0031048 A | 3/2013 |
| KR | 10-2019-0031462 A | 3/2019 |
| KR | 10-2019-0118007 A | 10/2019 |
| KR | 10-2021-0043445 A | 4/2021 |

OTHER PUBLICATIONS

Korean Office Action dated Jul. 22, 2024 issued in corresponding Korean Patent Appln. No. 10-2022-0189831.

*Primary Examiner* — Jason Y Ko

(74) *Attorney, Agent, or Firm* — Harness, Dickey & Pierce, P.L.C.

(57) ABSTRACT

The inventive concept provides a substrate transfer robot. The substrate transfer robot includes a fastening body; a support body protruding to a front from the fastening body, and supporting a bottom surface of the substrate if the substrate is positioned in a first posture; a gripper member coupled to the fastening body and relatively movable with respect to the support body; and a gripper driver moving the gripper member between a first position and a second position, and wherein the gripper member includes: a first gripper positioned at a side of the support body; and a second gripper positioned at another side of the support body, and wherein an alignment pin for aligning a position of the substrate is installed at the support body, and if a position at which the substrate is aligned with the support body is referred to as a reference position, the first position is a position at which the first gripper and the second gripper contact a substrate positioned at the reference position to grip the substrate, and the second position is a position at which the first gripper and the second gripper are spaced apart from the substrate positioned at the reference position, and the first posture is a posture that a top surface of the substrate is horizontal to the ground.

20 Claims, 20 Drawing Sheets

ROBOT FOR TRANSFERRING SUBSTRATE AND APPARATUS FOR TREATING SUBSTRATE

CROSS-REFERENCE TO RELATED APPLICATIONS

A claim for priority under 35 U.S.C. § 119 is made to Korean Patent Application No. 10-2022-0189831 filed on Dec. 29, 2022, in the Korean Intellectual Property Office, the entire contents of which are hereby incorporated by reference.

TECHNICAL FIELD

Embodiments of the inventive concept described herein relate to a robot for transferring a substrate and a substrate treating apparatus having the same.

BACKGROUND

In order to manufacture a semiconductor element, a desired pattern is formed on a substrate such as a wafer through various processes such as a photolithography process, an etching process, an ashing process, an ion implantation process, and a thin film deposition process on the substrate. In each process, various treating liquids and treating gases are used, and particles and process by-products are generated during the process. A liquid treatment process for the substrate is performed before and after each process in order to remove a thin film, particles, and process by-products on the substrate from the substrate. In a general liquid treatment process, the substrate is treated with a chemical and a rinsing liquid, and is then dried.

In addition, a substrate treating method using a treating liquid such as a chemical and/or a rinsing liquid can be divided into a batch-type treating method which collectively treats a plurality of substrates, and single-type treating method which treats substrates one by one.

In the batch-type treating method of collectively treating the plurality of substrates, a substrate treatment is performed by collectively immersing the plurality of substrates in a vertical posture in a treating bath in which the chemical or the rinsing liquid is stored. On the other hand, in the case of a single-type treating method in which substrates are treated one by one, the substrate treatment is performed to supply the chemical or the rinsing liquid to a single substrate rotating in a horizontal posture.

U.S. Patent Publication US 2021-0111038 A1 discloses an embodiment of an apparatus having both a batch-type treating unit and a single-type treating unit. In such an apparatus, it is necessary to grip the substrates immersed in the treating bath of the batch-type treating unit one by one with a transfer robot and transfer them to the single-type treating unit.

However, if the substrate immersed in the treating bath of the batch-type treating unit is gripped, it is difficult to grip accurately because the treating liquid in the treating bath flows and the substrate shakes. In addition, even if the substrate is gripped, a position of the substrate on the transfer robot is not aligned.

SUMMARY

Embodiments of the inventive concept provide a transfer robot and a substrate treating apparatus including the same for efficiently performing a substrate transfer.

Embodiments of the inventive concept provide a transfer robot and a substrate treating apparatus including the same which can maintain a substrate in an aligned state when gripping the substrate in a state in which the substrate is immersed in a liquid.

The technical objectives of the inventive concept are not limited to the above-mentioned ones, and the other unmentioned technical objects will become apparent to those skilled in the art from the following description.

The inventive concept provides a substrate transfer robot for transferring a substrate. The substrate transfer robot includes a fastening body; a support body protruding to a front from the fastening body, and supporting a bottom surface of the substrate if the substrate is positioned in a first posture; a gripper member coupled to the fastening body and relatively movable with respect to the support body; and a gripper driver moving the gripper member between a first position and a second position, and wherein the gripper member includes: a first gripper positioned at a side of the support body; and a second gripper positioned at another side of the support body, and wherein an alignment pin for aligning a position of the substrate is installed at the support body, and if a position at which the substrate is aligned with the support body is referred to as a reference position, the first position is a position at which the first gripper and the second gripper contact a substrate positioned at the reference position to grip the substrate, and the second position is a position at which the first gripper and the second gripper are spaced apart from the substrate positioned at the reference position, and the first posture is a posture that a top surface of the substrate is horizontal to the ground.

In an embodiment, the alignment pin upwardly protrudes from the support body at an end of the support body.

In an embodiment, the support body includes: a first support; and a second support spaced apart from the first support, and wherein the first gripper, the first support, the second support, and the second gripper are sequentially aligned in a direction, and the alignment pin is provided at each of the first support and the second support.

In an embodiment, the first gripper includes: a first side plate; a first support protrusion which protrudes in a direction toward the support body from the first side plate; and a second support protrusion which protrudes in a direction toward the support body from the first side plate, and wherein the second support protrusion is provided at a position which is further from the fastening body than the first support protrusion, and the second gripper includes: a second side plate; a third support protrusion which protrudes in a direction toward the support body from the second side plate; and a fourth support protrusion which protrudes in a direction toward the support body from the second side plate, and wherein the fourth support protrusion is further from the fastening body than the third support protrusion.

In an embodiment, if a line which is parallel to a direction in which the support body protrudes from the fastening body and passes a center of the substrate placed at the reference position is referred to as a first reference axis, the first support protrusion is provided to protrude to a position closer to the first reference axis than the second support protrusion, and the third support protrusion is provided to protrude to a position closer to the first reference axis than the fourth support protrusion.

In an embodiment, if a line which is vertical to the first reference axis and which is parallel to the substrate placed at the reference position and passes the center of the substrate is referred to as a second reference axis, the first support protrusion and the third support protrusion are positioned closer to the fastening body than the second reference axis, and the second support protrusion and the fourth support protrusion are positioned further from the fastening body than the second reference axis.

In an embodiment, the first support protrusion is further from the second reference axis than the second support protrusion.

In an embodiment, the first support protrusion and the third support protrusion are spaced apart from the second reference axis in the same distance, and the second support protrusion and the fourth support protrusion are spaced apart from the second reference axis in the same distance.

In an embodiment, a groove for inserting an end of the substance is formed at an end of each of the first support protrusion, the second support protrusion, the third support protrusion, and the fourth support protrusion.

In an embodiment, the gripper driver rotates the first gripper and the second gripper so the gripper member moves between the first position and the second position, and the second support protrusion and the fourth support protrusion contact the substrate positioned at the reference position after the first support protrusion and the third support protrusion contact the substrate positioned at the reference position.

In an embodiment, the substrate transfer robot further including: a rotation driver for rotating the fastening body so the substrate is posture changed between the first posture and a second posture, and wherein the second posture is a posture that a top surface of the substrate is perpendicular to the ground.

The inventive concept provides a substrate treating apparatus. The substrate treating apparatus includes a liquid bath having a storage space for filling a liquid within; a support unit configured to support a plurality of substrates positioned in a first posture within the storage space; and a transfer unit configured to transfer a substrate from the support unit one at a time, and which is provided to change a posture of the substrate from the first posture to a second posture, and wherein the first posture is a posture that a top surface of the substrate is horizontal to the ground and the second posture is a posture that a top surface of the substrate is perpendicular to the ground, and the transfer unit includes: a fastening body; a support body which protrudes from the fastening body to a front and which supports a bottom surface of the substrate if substrate is positioned in the first posture; a gripper member which is coupled the fastening body and which is relatively movable with respect to the support body; a gripper driver which moves the gripper member between a first position and a second position, and wherein the gripper member includes: a first gripper positioned at a side of the support body; and a second gripper positioned at another side of the support body, and wherein an alignment pin for aligning a position of the substrate by upwardly protruding from an end of the support body is installed at the support body, and if a position at which the substrate is aligned with the support body is referred to as a reference position of the substrate, the first position is a position at which the first gripper and the second gripper contact the substrate positioned at the reference position, and the second position is a position at which the first gripper and the second gripper are spaced apart from the substrate positioned at the reference position.

In an embodiment, the substrate treating apparatus further includes a controller, and wherein the controller controls the transfer unit to perform a posture change within a liquid filled within the liquid bath.

In an embodiment, the storage space includes a first region and a second region which are aligned with each other when seen from above, and the plurality of substrates are supported by the support unit at the first region, and the transfer unit changes the posture of the substrate between the first posture to the second posture at the second region.

In an embodiment, the support body includes: a first support: and a second support spaced apart from the first support, and wherein the first gripper, the first support, the second support, and the second gripper are sequentially positioned in a direction, and the alignment pin is provided at each of the first support and the second support, and wherein the first gripper includes: a first side plate; a first support protrusion protruding in a direction toward the support body from the first side plate; a second support protrusion protruding in a direction toward the support body from the first side plate, and wherein the second support protrusion is provided at a position further from the fastening body than the first support protrusion, and the second gripper includes: a second side plate; a third support protrusion which protrudes from the second side plate in a direction toward the support body; a fourth support protrusion which protrudes from the second side plate in a direction toward the support body, and the fourth support protrusion is provided at a position further from the fastening body than the third support protrusion.

In an embodiment, if a line which is parallel to a direction in which the support body protrudes from the fastening body and passes a center of the substrate placed at the reference position is referred to as a first reference axis, the first support protrusion is provided to protrude to a position closer to the first reference axis than the second support protrusion, and the third support protrusion is provided to protrude to a position closer to the first reference axis than the fourth support protrusion, and a groove for inserting an end of the substance is formed at an end of each of the first support protrusion, the second support protrusion, the third support protrusion, and the fourth support protrusion.

In an embodiment, the gripper driver rotates the first gripper and the second gripper so the gripper member moves between the first position and the second position, and the second support protrusion and the fourth support protrusion contact the substrate positioned at the reference position after the first support protrusion and the third support protrusion contact the substrate positioned at the reference position.

The inventive concept provides a substrate treating apparatus. The substrate treating apparatus includes a first process treating unit having a liquid treating bath for treating a plurality of substrates at once in a first posture; and a second process treating unit having a liquid treating chamber for treating a substrate one at a time in a second posture, and wherein the first process treating unit includes: a liquid treating bath for liquid treating the plurality of substrates provided in the first posture by immersing in a treating liquid; a standby bath for standing by the plurality of substrates treated in the liquid treating bath in a rinsing liquid in the first posture; a transfer unit for transferring the plurality of substrates standing by in the standby bath one at a time to the second process treating unit, which is provided to change a posture of the substrate from the second posture to the first posture, and wherein the first posture is a posture that a top surface of the substrate is horizontal to the ground and the second posture is a posture that a top surface of the substrate is perpendicular to the ground, and the transfer unit includes: a fastening body; a support body which protrudes from the fastening body to a front and which supports a bottom surface of the substrate if substrate is positioned in the first posture; a gripper member which is coupled the fastening body and which is relatively movable with respect to the support body; a gripper driver which moves the gripper member between a first position and a second position, and wherein the gripper member includes: a first gripper positioned at a side of the support body; and a second gripper positioned at another side of the support body, and wherein an alignment pin for aligning a position of the substrate by upwardly protruding from an end of the support body is installed at the support body, and if a position at which the substrate is aligned with the support body is referred to as a reference position of the substrate, the first position is a position at which the first gripper and the second gripper contact the substrate positioned at the reference position, and the second position is a position at which the first gripper and the second gripper are spaced apart from the substrate positioned at the reference position.

In an embodiment, the support body includes: a first support: and a second support spaced apart from the first support, and wherein the first gripper, the first support, the second support, and the second gripper are sequentially positioned in a direction, and the alignment pin is provided at each of the first support and the second support, and wherein the first gripper includes: a first side plate; a first support protrusion protruding in a direction toward the support body from the first side plate; a second support protrusion protruding in a direction toward the support body from the first side plate, and wherein the second support protrusion is provided at a position further from the fastening body than the first support protrusion, and the second gripper includes: a second side plate; a third support protrusion which protrudes from the second side plate in a direction toward the support body; a fourth support protrusion which protrudes from the second side plate in a direction toward the support body, and the fourth support protrusion is provided at a position further from the fastening body than the third support protrusion.

In an embodiment, the gripper driver rotates the first gripper and the second gripper so the gripper member moves between the first position and the second position, and the second support protrusion and the fourth support protrusion contact the substrate positioned at the reference position after the first support protrusion and the third support protrusion contact the substrate positioned at the reference position.

According to an embodiment of the inventive concept, a substrate transfer robot may efficiently perform a substrate transfer.

According to an embodiment of the inventive concept, a substrate may be gripped in an aligned state by a transfer robot when the substrate transfer robot grips the substrate.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
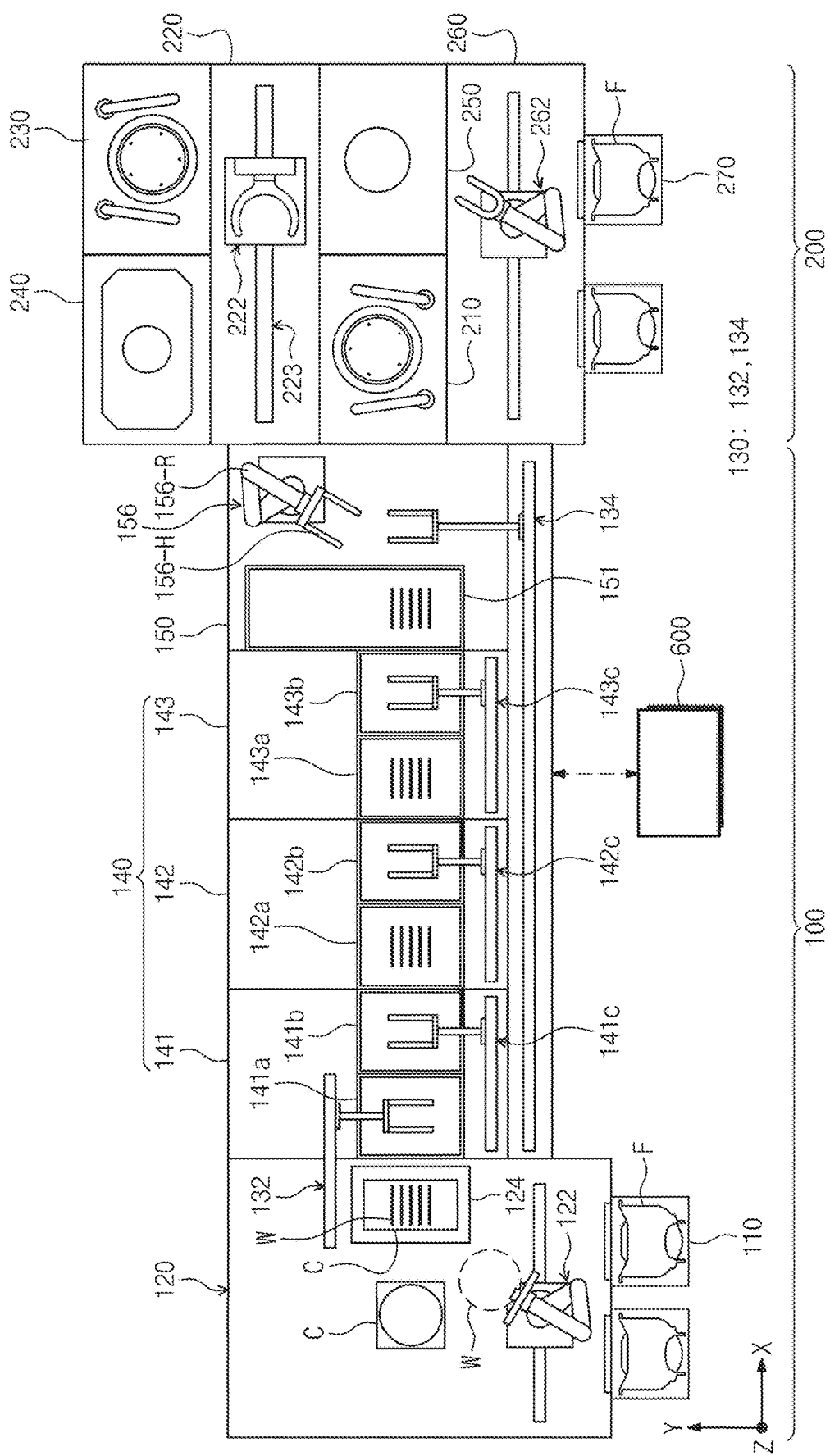
FIG. 1 is a plan view schematically illustrating a substrate treating apparatus according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising,", "includes", and/or "including" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "example" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Other terms such as "between", "adjacent", "near" or the like should be interpreted in the same way.

Unless otherwise defined, all terms used herein, including technical or scientific terms, have the same meaning as those generally understood by those skilled in the art to which the inventive concept belongs. Terms such as those defined in commonly used dictionaries should be interpreted as consistent with the context of the relevant technology and not as ideal or excessively formal unless clearly defined in this application.

Also, a configuration transferring a substrate W to be described later, for example, a transfer unit or transfer robots to be described later, may be referred to as a transfer module.

Hereinafter, an embodiment of the inventive concept will be described with reference to FIG. 1 to FIG. 20.

FIG. 1 is a schematic view of a substrate treating apparatus according to an embodiment of the inventive concept as viewed from above.

Referring to FIG. 1, the substrate treating apparatus 10 according to an embodiment of the inventive concept may include a first process treating unit 100, a second process treating unit 200, and a controller 600. The first process treating unit 100 and the second process treating unit 200 may be arranged in a direction when viewed from above. Hereinafter, a direction in which the first process treating unit 100, the second process treating unit 200, and the controller are arranged is referred to as a first direction X, a direction perpendicular to the first direction X when viewed from above is referred to as a second direction Y, and a direction perpendicular to the first direction X and the second direction Y is referred to as a third direction Z.

The first process treating unit 100 may collectively liquid treat a plurality of substrates W in a batch manner. For example, a liquid treatment may be a cleaning treatment of removing an unnecessary layer or a particle from a substrate. The first process treating unit 100 may simultaneously process the plurality of substrates W in a state in which a pattern surface of the substrate W is in a direction perpendicular to the ground.

The first process treating unit 100 may include a first load port unit 110, an index chamber 120, a transfer unit 130, a liquid treating unit, and a posture change portion 150.

The first load port unit 110 may include at least one load port. A transfer container F in which the substrate W is stored may be placed on the load ports of the first load port unit 110. The plurality of substrates W may be stored in the transfer container F. For example, 25 substrates may be stored in the transfer container F. The transfer container F may be referred to as a cassette, a pod FOD, a FOUP, or the like. The transfer container F may be loaded onto the first load port unit 110 by a container transfer apparatus. The substrates W stored in the transfer container F placed in the first load port unit 110 may be untreated substrates W. An untreated substrate W may be, for example, a substrate W which has not been treated, or substrates W which have been partially treated but require a liquid treatment.

In addition, the container F in which the untreated substrate W is stored may be placed on the first load port unit 110. That is, the first load port unit 110 may serve to load the substrate W requiring a treatment.

The first load port unit 110 may be coupled to the index chamber 120. The index chamber 120 and the first load port unit 110 may be arranged in the second direction Y. The first index chamber 120 may include an index robot 122 and a posture change unit 124. The index robot 122 may take out a substrate W which has not been treated or which requires a treatment from the container F mounted on the first load port unit 110. The first transfer robot 122 may take in the substrate W from the container F and take the substrate W into the storage container C provided in the first index chamber 120. The first transfer robot 122 may have a batch hand capable of simultaneously gripping and transferring a plurality of substrates W (e.g., 25 sheets).

The storage container C may have a container shape. The storage container C may have a storage space therein. The plurality of substrates W may be stored in the storage space of the storage container C. For example, 50 substrates W may be stored in the storage space of the storage container C. The storage container C may have a container shape in which at least two or more of the surfaces of the storage container C are opened. A support member for supporting/gripping the substrate W may be provided in the storage space of the storage container C.

If the substrate W taken out from the transfer container F is completely brought into the storage container C, the storage container C may be taken to the posture change unit 124 arranged in the index chamber 120 by a transportation means which is not shown. The posture change unit 124 may rotate the storage container C. For example, the posture change unit 124 may rotate the storage container C such that an opened portion of the storage container C faces upward. If the open portion of the storage container C is rotated to face the top, the substrate W stored in the storage container C may be changed from a first posture (a posture in which the top and bottom surfaces of the substrate W are horizontal to the ground) to a second posture. The first posture may mean that the top surface of the substrate W (e.g., a patterned surface) is parallel to an X-Y plane (i.e., the ground), and the second posture may mean that the top surface of the substrate W is parallel to an X-Z plane or a Y-Z plane (i.e., a surface perpendicular to the ground).

The transfer unit 130 may include a first transfer unit 132 which transfers the substrate W between the index chamber 120 and the batch-type treating unit 140, and a second transfer unit 134 which transfers the substrate W between the batch-type treating unit 140 and the posture change portion 150 to be described later.

The first transfer unit 132 may include a rail extending along the first direction X and a hand configured to transfer the plurality of substrates W at once. The first transfer unit 132 may grip the substrates W which posture has been changed in a posture change unit 124 and transfer a gripped substrate W to the liquid treating unit. For example, the first transfer unit 132 may transfer the substrates W which posture has been changed in the posture change unit 124 to any selected one of the batch-type treating baths 141A to 143B of the batch-type treating unit 140. The second transfer unit 134 may include a rail extending in the first direction X, and a hand configured to transfer the plurality of substrates W at once.

The second transfer unit 134 may be configured to transfer the substrate W between the first batch-type treating unit 141, the second batch-type treating unit 142, and the third batch-type treating unit 143 of the batch-type treating unit 140. In addition, the second transfer unit 134 may be configured to transfer the substrate W between the batch-type treating unit 140 and the posture change portion 150.

The liquid treating unit may liquid treat the substrate W by supplying a treating liquid to the substrate W.

In an embodiment, the liquid treating unit is provided as a batch-type treating unit 140 which liquid treats the plurality of substrates W at once. The batch-type treating unit 140 may liquid treat a plurality of substrates W at once with the treating liquid. The batch-type treating unit 140 may clean the plurality of substrates W at once using the treating liquid. The batch-type treating unit 140 may liquid treat the plurality of substrates W at once using the treating liquid. The treating liquid used in the batch-type treating unit 140 may be a chemical and/or a rinsing liquid. For example, the chemical may be a chemical having the properties of a strong acid or a strong base. Also, the rinsing liquid can be a pure water. For example, the chemical may be chosen appropriately among an Ammonia-Hydrogen Peroxide Mix (APM), a Hydrochloride Peroxide Mix (HPM), a Hydrofluoric acid (FPM), a Hydrofluoric acid (Hydrogen Peroxide Mix), a Diluted Hydrooxide Mix (DHF), a chemical removing a SiN, a chemical including a phosphoric acid, or a chemical including a sulfuric acid. The rinsing liquid may be a liquid containing a water. For example, the rinsing liquid may be a pure water.

The batch-type treating unit 140 includes a first batch-type treating unit 141, a second batch-type treating unit 142, and a third batch-type treating unit 143.

The first batch-type treating unit 141, the second batch-type treating unit 142, the third batch-type treating unit 143 each include a chemical bath, a rinsing bath, and a batch-type transfer unit which transports substrates W between them.

In each batch-type treating unit, the substrate W is treated with a first treating liquid in the chemical bath, and then treated with a second treating liquid in the rinsing bath. The first treating liquid may be a chemical, and the second treating liquid may be a rinsing liquid.

A posture is changed by the posture change unit 124 and the substrates W stored in the storage container C and the substrates W stored in the batch-type treating bath of the batch-type treating unit 140 may be arranged side by side in the first direction X when viewed from above.

In addition, the substrates W stored in the liquid treating unit batch-type treating baths 141a to 143b of the batch-type treating unit 140 and the substrates W stored in the posture change treating bath 151 of the posture change unit 150 may be arranged side by side along the first direction X when viewed from the top. In addition, the substrates W housed in the batch-type treating baths 141a to 143b of the batch-type treating unit 140 may be arranged side by side along the first direction X when viewed from the top. That is, the support member 141a-6 of each of the batch-type treating baths 141a to 143b and the support member 153 of the posture change treating bath 151 may be arranged side by side in the first direction X when viewed from above.

The first batch-type treating unit 141 may include a first chemical bath 141a, a first rinsing bath 141b, and a first batch-type transfer unit 141c.

In the first chemical bath 141a, a plurality of substrates W may be simultaneously liquid-treated with a chemical such as a DHP. In the first rinsing bath 141b the plurality of substrates W may be simultaneously treated with a rinsing liquid. However, the inventive concept is not limited thereto, and the treating liquid used in the first chemical bath 141a may be variously transformed into a treating liquid selected from the aforementioned treating liquid.

In the first chemical bath, a thin film on the substrate W, a residual membrane on the substrate W, or an impurity on the substrate W may be removed by the chemical. In the first rinsing bath 141b, the plurality of substrates W may be simultaneously treated with the rinsing liquid such as a pure water. In the first rinsing bath, the chemical remaining on the substrate W after being used during a treatment of the substrate W in the first chemical bath is removed from the substrate W.

The first batch-type transfer unit 141c may be configured to transfer the substrate W between the first chemical bath 141a and the second rinsing bath 141b.

The second batch-type treating unit 142 may include a second chemical bath 142a, a second rinsing bath 142b, and a second batch-type transfer unit 142c.

In the second chemical bath 142a, the plurality of substrates W may be simultaneously liquid-treated with a chemical containing a phosphoric acid. In the second rinsing bath 142b, the plurality of substrates W may be simultaneously treated with the rinsing liquid. However, the inventive concept is not limited thereto, and the treating liquid used in the second chemical bath 142a may be variously modified to a treating liquid selected from the above-described treating liquids.

The second batch-type transfer unit 142c may be configured to transfer the substrate W between the second chemical bath 141a and the second rinsing bath 142b.

The third batch-type treating unit 143 may include a third chemical unit 143a, a third rinsing unit 143b, and a third batch-type transfer unit 143c.

In the third chemical unit 143a, the plurality of substrates W may be simultaneously liquid-treated with the chemical containing the phosphoric acid. In the third rinsing bath 143b, the plurality of substrates W may be simultaneously treated with the rinsing liquid. However, the inventive concept is not limited thereto, and the treating liquid used in the third chemical unit 143a may be variously modified to a treating liquid selected from the aforementioned treating liquids.

The third batch-type transfer unit 143c may be configured to transfer the substrate W between the third chemical unit 143a and the third rinsing unit 143b.

According to an embodiment, the second batch-type treating unit 142 and the third batch-type treating unit 143 may treat the substrate W with the same chemical, and the first batch-type treating unit 141 may treat the substrate W with a different chemical from the second batch-type treating unit 142 or the third batch-type treating unit 143. Hereinafter, the second batch-type treating unit 142 and the third batch-type treating unit 143 treat the substrate W with a phosphoric acid solution, and the first batch-type treating unit 141 may treat the substrate W with any of the chemicals described above.

In FIG. 1, the batch-type treating unit 140 includes a first batch-type treating unit 141 to a third batch-type treating unit 143, but the inventive concept is not limited thereto.

For example, an additional batch-type treating unit may be further provided. The additional batch-type treating unit may treat the substrate W with the same or different chemicals as the first batch-type treating unit 141, the second batch-type treating unit 142, or the third batch-type treating unit 143.

Selectively, the batch-type treating unit 140 may include only the second batch-type treating unit 142 and the third batch-type treating unit 143 without the first batch-type treating unit 141.

Selectively, the batch-type treating unit 140 may include only the second batch-type treating unit 142.

Hereinafter, a structure of the batch-type treating unit 140 will be described in detail.

The first batch-type treating unit 141, the second batch-type treating unit 142, and the third batch-type treating unit 143 are provided in the same or similar structure. Hereinafter, the second batch-type treating unit 142 will be mainly described.

The second batch-type treating unit 142 has a second chemical bath 142*a*, a second rinsing bath 142*b*, and a second batch-type transfer unit 142*c*.

Figure 2:
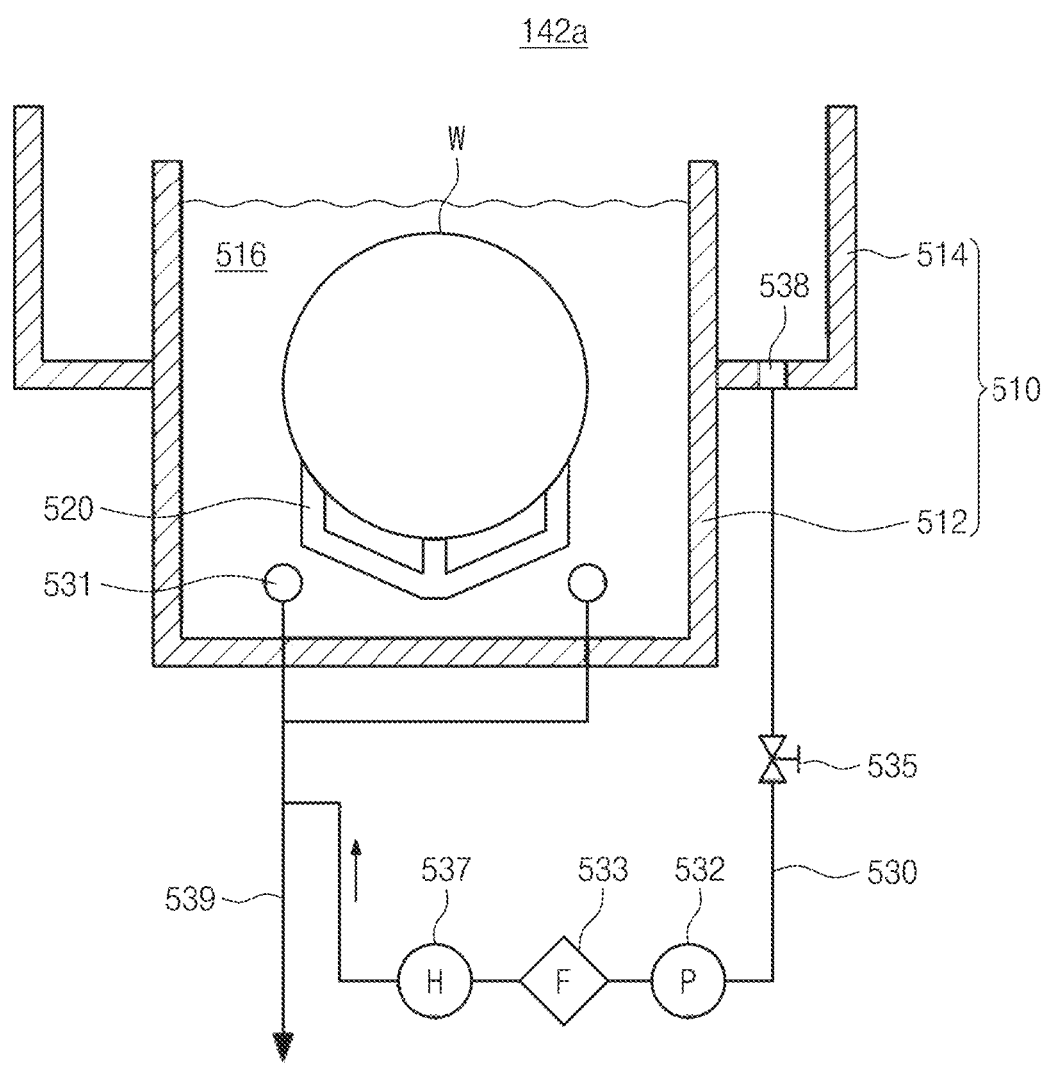
FIG. 2 schematically illustrates a chemical of a batch-type treating unit of FIG. 1.

FIG. 2 is a view schematically illustrating a structure of a second chemical bath.

The second chemical bath 142*a* has a liquid bath 510, a support unit 520, a circulation line 530, and a liquid pipe supply 531.

The liquid bath 510 may include an inner bath 512 and an outer bath 514. The inner bath 512 may have a storage space 516. The inner bath 512 may have a container shape with an open top. For example, the inner bath 512 may have a rectangular parallelepiped shape. A phosphoric acid solution may be stored in the storage space 516.

The outer bath 514 is provided to surround the inner bath 512 at an outside of the inner bath 512. For example, the outer bath 514 has a rectangular parallelepiped container shape similar to the inner bath 512. The outer bath 514 is provided in a larger size than the inner bath 512. The outer bath 514 stores the phosphoric acid solution overflowing from the inner bath 512. An outlet for discharging the phosphoric acid solution is formed in the outer bath 514. The outlet is formed on a bottom surface of the outer bath 514. The phosphoric acid solution overflowing from the inner bath 512 to the outer bath 514 is discharged from the outer bath 514 through the outlet (not shown) which is connected to the circulation line 530 to be described later.

The support unit 520 is disposed in the storage space 516. The support unit 520 may support the substrate W. The support unit 520 may be configured to support the plurality of substrates W. For example, the support unit 520 may be configured to support 25 or 50 substrates W.

Figure 3:
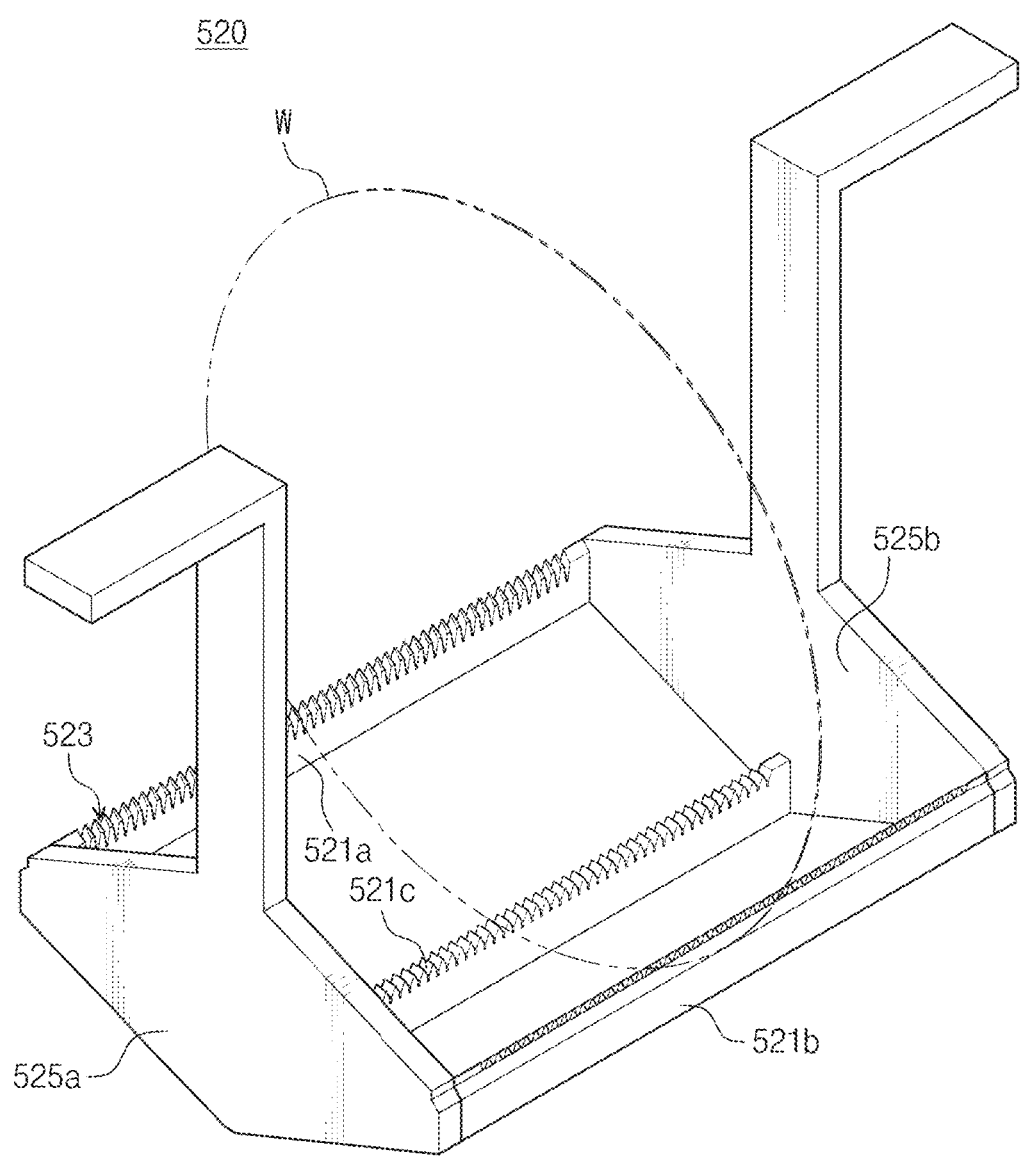
FIG. 3 is a perspective view schematically illustrating an embodiment of a support unit of a chemical bath of FIG. 2.

FIG. 3 is a perspective view illustrating an embodiment of the support unit of FIG. 2.

Referring to FIG. 3, the support unit 520 has a support 521 and a fixing plate 525.

A plurality of supports 521 are provided. Two to five supports 521 may be provided so that the substrates W are stably supported. According to an embodiment, a first support 521*a*, a second support 521*b*, and a third support 521*c* are provided. Each of the first support 521*a*, the second support 521*b*, and the third support 521*c* has a rod shape. The first support 521*a* and the second support 521*b* are spaced apart from each other at the same height.

The first support 521*a* and the second support 521*b* support a side end of the substrate W. The first support 521*a* and the second support 521*b* are disposed to face each other.

The third support 521*c* is positioned between the first support 521*a* and the second support 521*b* when viewed from above. The third support 521*c* is disposed at a position lower than the first support 521*a*. The third support 521*c* supports a bottom end of the substrate W.

A plurality of slots 523 are formed at a top end of the supports 521*a*, 521*b*, 521*c* at predetermined intervals in a lengthwise direction of the supports 521*a*, 521*b*, 521*c*. An edge of the substrate W may be inserted into the slot 523. The slots 523 are formed in a number corresponding to the number of substrates W. For example, 25 or 50 slots 523 may be formed.

The fixing plate 525 fixes the supports 521*a*, 521*b*, and 521*c* to each other. Two fixing plates 525 are provided. An end of the supports 521*a*, 521*b*, and 521*c* is coupled to the first fixing plate 525*a*. The other ends of the supports 521*a*, 521*b*, and 521*c* are coupled to the second fixing plate 525*b*.

Referring back to FIG. 2, the circulation line 530 circulates the phosphoric acid solution in the liquid bath 510. An end of the circulation line 530 is connected to the outlet 538 of the outer bath 514 and the other end thereof is connected to the liquid supply pipe 531. The circulation line 530 may branch to include a drain port 539.

A pump 532, a filter 533, a valve 535, and a heater 537 are installed in the circulation line 530. The pump 532 provides a flow pressure to the phosphoric acid solution so that the phosphoric acid solution circulates along the circulation line 530.

The filter 533 removes foreign substances from the phosphoric acid solution circulating in the circulation line 530.

The valve 535 opens and closes the circulation line 530. If the valve 535 is opened, the phosphoric acid solution in the liquid bath 510 is continuously circulated along the circulation line 530.

The heater 537 may heat a temperature of the phosphoric acid solution supplied to the inner bath 512 to a predetermined temperature.

The liquid supply pipe 531 supplies the phosphoric acid solution to the inner bath 512. The liquid supply pipe 531 is disposed in the inner bath 512. The liquid supply pipe 531 may be disposed below the support unit 520 in the inner bath 512.

The liquid supply pipe 531 is disposed in a lengthwise direction parallel to an arrangement direction of the substrates W. A plurality of supply holes are formed in the liquid supply pipe 531 along a lengthwise direction thereof. The supply hole may be formed at a top end of the liquid supply pipe 531. A circulation line 141-B1-530 is connected to an end of the liquid supply pipe 531. The other end of the liquid supply pipe 531 may be provided as a blocking surface.

A plurality of liquid supply pipes 531 may be provided. In this case, the liquid supply pipes 531 may be disposed parallel to each other.

The drain port 539 may be connected to the circulation line 530 to drain the phosphoric acid solution from the inner bath 512 and the circulation line 530.

Selectively, a bubble supply pipe (not shown) providing bubbles may be installed within the inner bath 512. The bubble supply pipe may be disposed below the support unit 520 in the inner bath 512.

Figure 4:
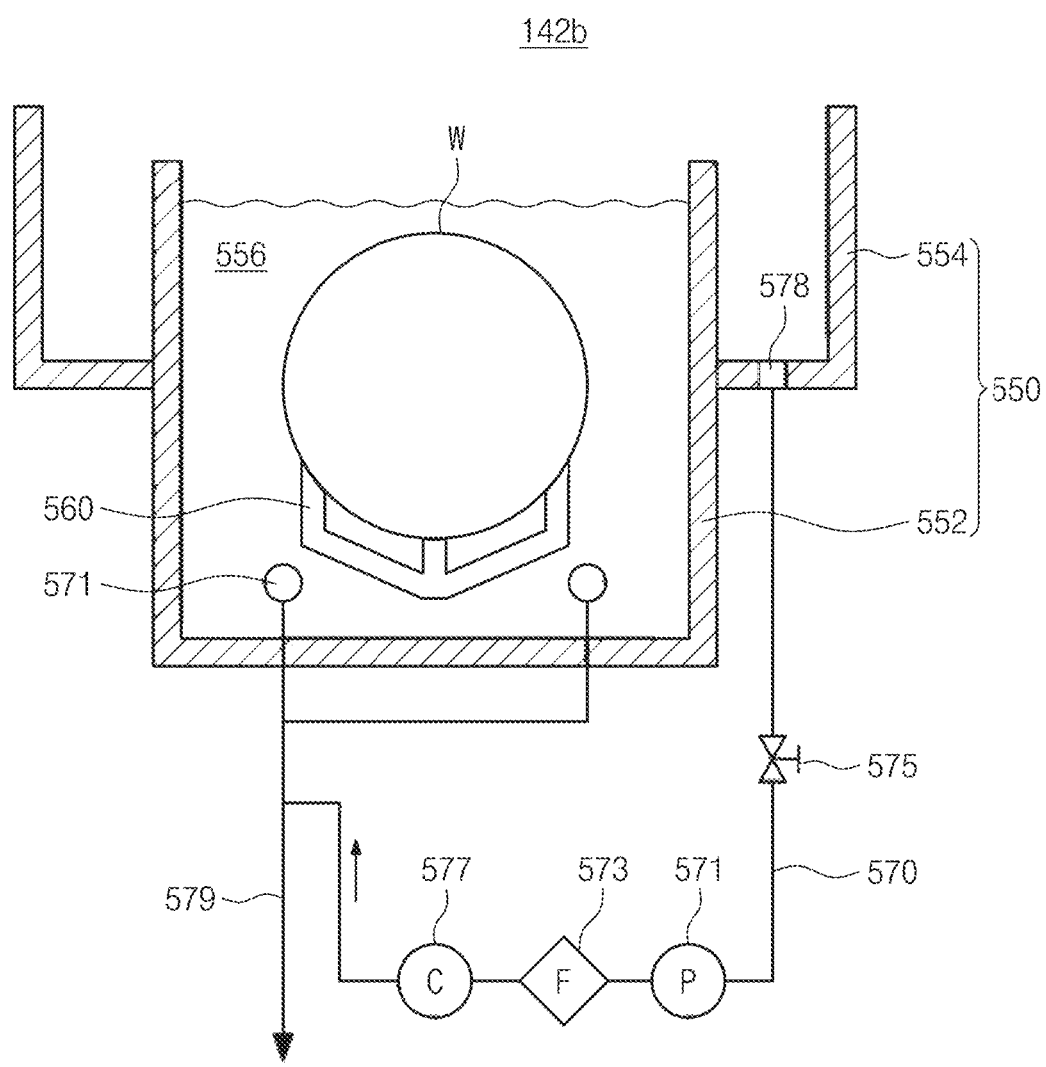
FIG. 4 schematically illustrates a rinsing bath of the batch-type treating unit of FIG. 1.

FIG. 4 is a view schematically illustrating a structure of the second rinsing bath of the batch-type treating bath of FIG. 1.

Referring to FIG. 4, the second rinsing bath 142*b* has a liquid bath 550, a support unit 560, a circulation line 570, and a liquid supply pipe 571.

The liquid bath 550 may have an inner bath 552 and an outer bath 554. The inner bath 552 and the outer bath 554 may have the same shape and structure as the inner bath 512 and the outer bath 554 of the second chemical bath 142*a*.

The support unit 560 is disposed in the storage space 556. The support unit 560 may support the substrate W. The support unit 560 may have the same structure and shape as the support unit 520 in the second chemical bath 142a.

The circulation line 570 circulates a pure water within the liquid bath. An end of the circulation line 570 is connected to the outlet 578 of the outer bath 554, and the other end thereof is connected to the liquid supply pipe 571. The circulation line 570 may branch to include a drain port 579.

A pump 572, a filter 573, a valve 575, and a cooler 577 are installed in the circulation line 570.

The pump 572, the filter 573, and the valve 575 may perform the same function as the pump 532, the filter 533, and the valve 535 of the second chemical bath 142a and may be disposed the same or similar. The cooler 577 may cool a supply temperature of the pure water supplied to the inner bath 552 to a set temperature.

The liquid supply pipe 571 supplies the pure water to the inner bath 552. The liquid supply pipe 571 may be provided in the same structure and arrangement as the liquid supply pipe 531 of the second chemical bath 142a.

The drain port 579 may be connected to the circulation line 530 to drain the phosphoric acid solution from the inner bath 512 and the circulation line 530.

Selectively, the bubble supply pipe (not shown) providing bubbles may be installed within the inner bath 552. The bubble supply pipe may be disposed below the support unit 560 in the inner bath 552.

The second batch-type transfer unit 142c may be configured to transfer the substrate W between the second chemical bath 142a and the second rinsing bath 142b.

Figure 5:
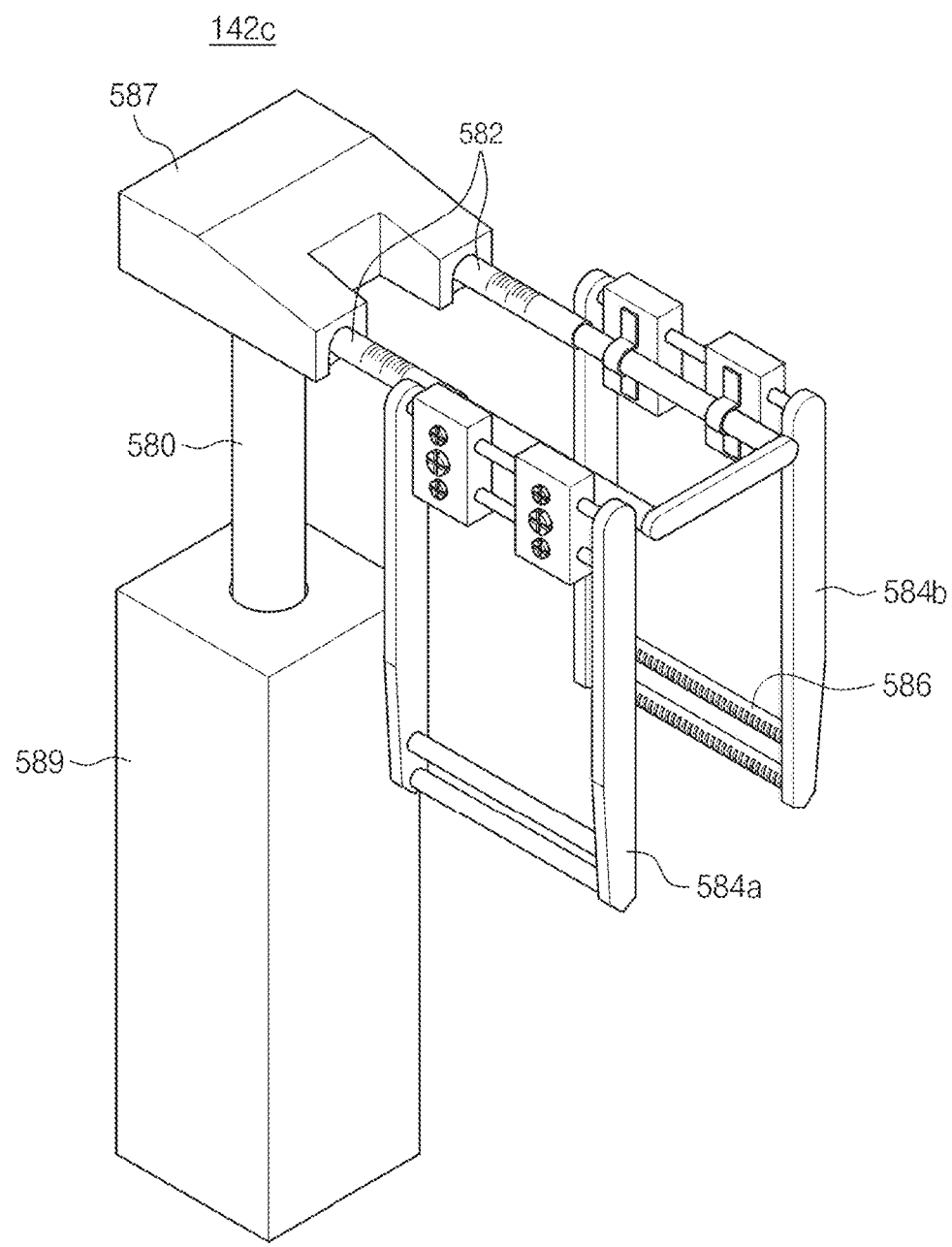
FIG. 5 is a perspective view schematically illustrating an embodiment of a second batch-type transfer unit of the batch-type treating unit of FIG. 1.

FIG. 5 is a perspective view illustrating an embodiment of the second batch-type transfer unit of FIG. 1.

Referring to FIG. 5, the second batch-type transfer unit 142c has a body 580, a gripper member 582, a gripper driver 587, and a body driver 589.

The body 580 is provided coupled to a side of the second batch-type treating unit 142 and movable in a straight line.

The gripper member 582 is mounted on the body 580. The gripper member 582 is provided to hold the substrate W. The gripper member 582 is provided to be movable in the vertical direction with respect to the body 580. The gripper member 582 includes a first gripper 584a and a second gripper 584b. The first gripper 584a and the second gripper 584b are disposed to be spaced apart from each other.

The first gripper 584a and the second gripper 584b have the same structure.

Each of the grippers 584a and 584b is provided with a plurality of gripping grooves 586 in the lengthwise direction thereof.

The gripper driver 587 may move the gripper member 582 between a first position and a second position.

The first position is a position at which the gripper member 582 holds the substrate W, and the second position is a position at which the gripper member 582 is spaced apart from the substrate W.

If moving from the second position to the first position, the first gripper 584a and the second gripper 584b may rotate in a direction facing each other.

If moving from the first position to the second position, the first gripper 584a and the second gripper 584b may rotate in a direction away from each other.

Referring back to FIG. 1, the posture change portion 150 may change the posture of the substrate W. The posture change portion 150 may change the substrate W having the second posture to the first posture. The posture change portion 150 may change the posture of the substrate W so that the substrate W treated in the second posture in the batch-type treating unit 140 may be post-treated in the single-type treating chambers 230 and 240 which treat the substrate W in the first posture. The posture change portion 150 may be disposed between the batch-type treating unit 140 and the second process treating unit 200.

The posture change portion 150 may include a posture change treating bath 151 and a posture change robot 156. When viewed from above, the posture change treating bath 151 may have a greater width than the batch-type treating baths 141A to 143B. For example, when viewed from above, the posture change treating bath 151 may have a larger width in the second direction Y (a direction) than the batch-type treating baths 141A to 143B. Also, the posture change treating bath 151 may have the same width as the batch-type treating baths 141A to 143B in the first direction X (another direction) when viewed from above.

Figure 6:
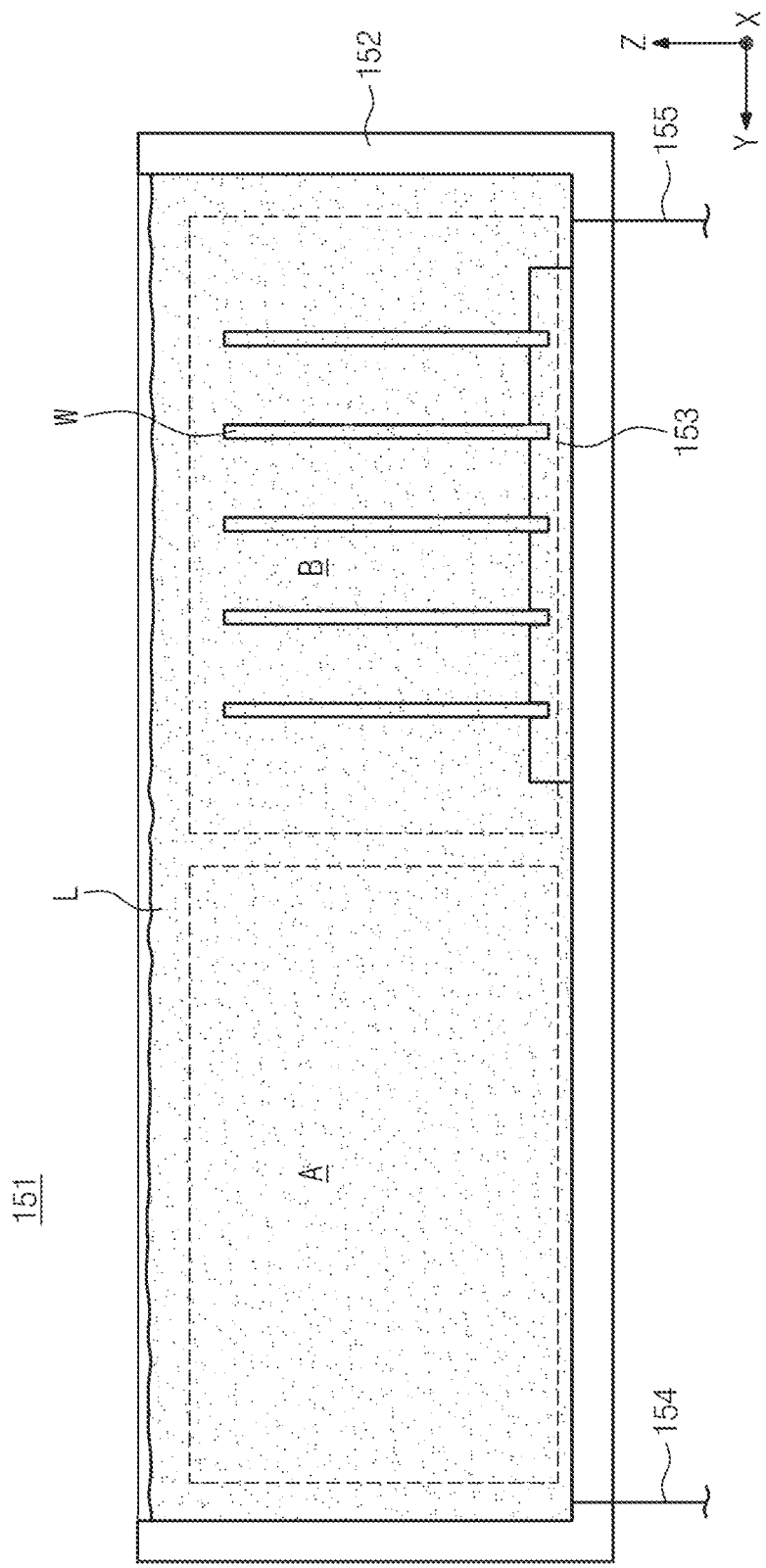
FIG. 6 is a plan view schematically showing a posture change treating bath of FIG. 1.

FIG. 6 schematically illustrates a state of the posture change treating bath of FIG. 1.

Referring to FIG. 6, the posture change treating bath 151 may include a treating bath 152, a support member 153, a supply line 154, and a draining line 155.

The treating bath 152 may have a container shape with an open top. For example, the treating bath 152 may have a rectangular container shape with an open top. The treating bath 152 may have storage spaces A and B in which the treating liquid L may be stored. The treating liquid L stored in the treating bath 152 may be a liquid containing a water.

The support member 153 may be disposed in the storage spaces A and B to support the substrate W. The support member 153 may be configured to support a plurality of substrates W. For example, the support member 153 may be configured to support 50 substrates W. The support member 153 may be arranged so that a pair of rod-shaped bodies face each other, and a support groove (not shown) through which the substrate W can be supported is formed in each body.

The supply line 154 may supply the treating liquid L to the storage spaces A and B. The draining line 155 may drain the treating liquid L in the storage spaces A and B. A valve is installed in each of the supply line 154 and the draining line 155, and a level of the treating liquid L stored in the storage spaces A and B (that is, an amount of the treating liquid L stored in the storage spaces A and B) can be adjusted to a set level based on a liquid level of the treating liquid L sensed by a liquid level sensor (not shown).

In addition, the storage spaces A and B may include a first region and a second region. The first region and the second region may be positioned side by side when viewed from above. The first region may be provided as a support region A. The second region may be provided as a posture change region B. The support member is positioned at the support region A. The posture change robot 156 to be described later changes the posture of the substrate W at the posture change region B.

Referring back to FIG. 1, the posture change robot 156 may be disposed on a side of the posture change treating bath 151. The posture change robot 156 may be disposed between the posture change treating bath 151 and a standby chamber 210 to be described later.

The posture change robot 156 may include a hand 800 and a joint portion 156-R. The hand 800 may be coupled to the joint portion 156-R. The joint portion 156-R may change a position of the hand 800.

Figure 7:
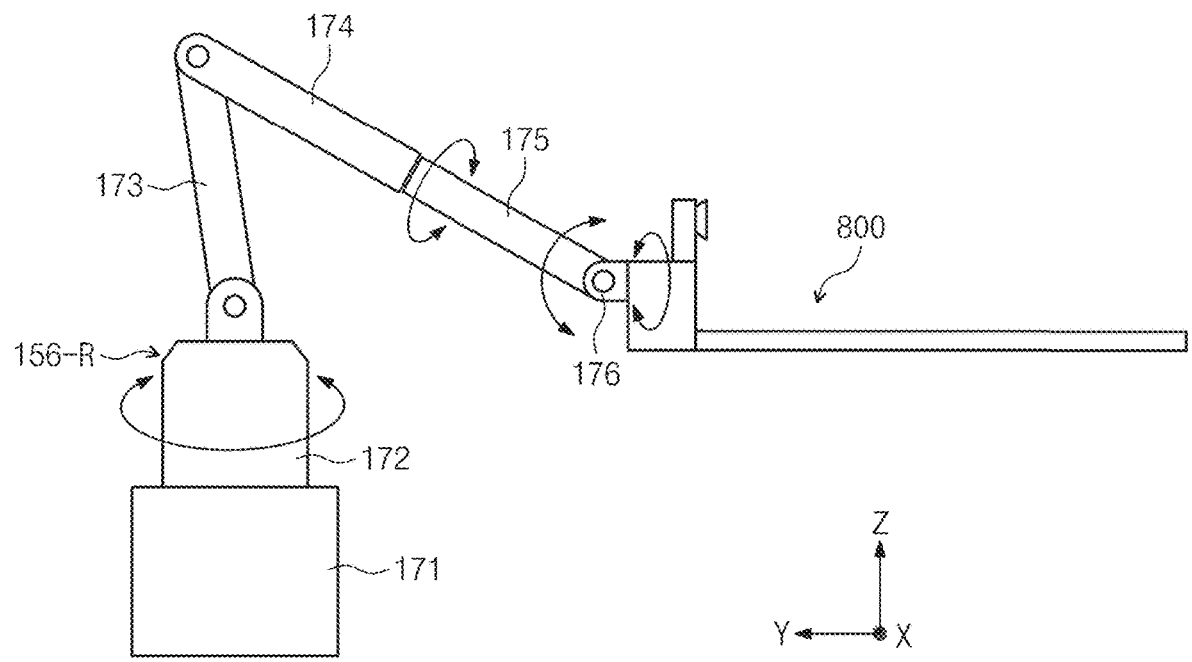
FIG. 7 schematically illustrates a posture change robot of FIG. 1.

FIG. 7 schematically illustrates the posture change robot of FIG. 1.

Referring to FIG. 7, the posture change robot 156 according to an embodiment of the inventive concept may change the posture of the substrate W. More specifically, the posture is changed from the second posture which is vertical, to the first posture which is horizontal. The substrate W which posture has changed to the first posture may be transferred to the standby chamber 210 of the second process treating unit 200.

Also, the posture change robot 156 may be a multi-joint robot. The posture change robot 156 may be a six-axis multi-joint robot.

The joint portion 156-R may be a multi-joint arm composed of at least two or more axes. For example, the joint portion 156-R may be a 6-axis multi-joint arm. The joint portion 156-R may change the position of the hand 800 by moving the hand 800 in at least one of the first direction X, the second direction Y, and the third direction Z. In addition, the joint portion 156-R may rotate the hand 800 based on one of the axes in the first direction X, the second direction Y, and the third direction Z.

The posture change robot 156 may include a base 171, a rotating body 172, a first arm 173, a second arm 174, a third arm 175, and a fourth arm 176.

The base 171 may be coupled to the rotating body 172. The rotating body 172 may rotate with respect to the base 171. The rotation body 172 may be rotated with a direction perpendicular to the ground as a rotation axis. The first arm 173 may be coupled to the rotating body 172. The first arm 173 may be rotated with respect to the rotation body with the horizontal direction as a rotation axis. The second arm 174 may be coupled to the first arm 173. The second arm 174 may be rotated with respect to the first arm 173 with the horizontal direction as a rotation axis. The third arm 175 may be coupled to the second arm 174. The third arm 175 may rotate around a lengthwise direction (or a lengthwise direction of the third arm 175) of the second arm 174. The fourth arm 176 may be rotated in a direction perpendicular to the lengthwise direction of the third arm 175. In addition, the fourth arm 176 may rotate the hand 800. For example, the fourth arm 176 may have a rotation shaft (not shown) capable of rotating the hand 800. The hand 800 may be rotated in a direction perpendicular to a rotation axis of the fourth arm 176.

Figure 8:
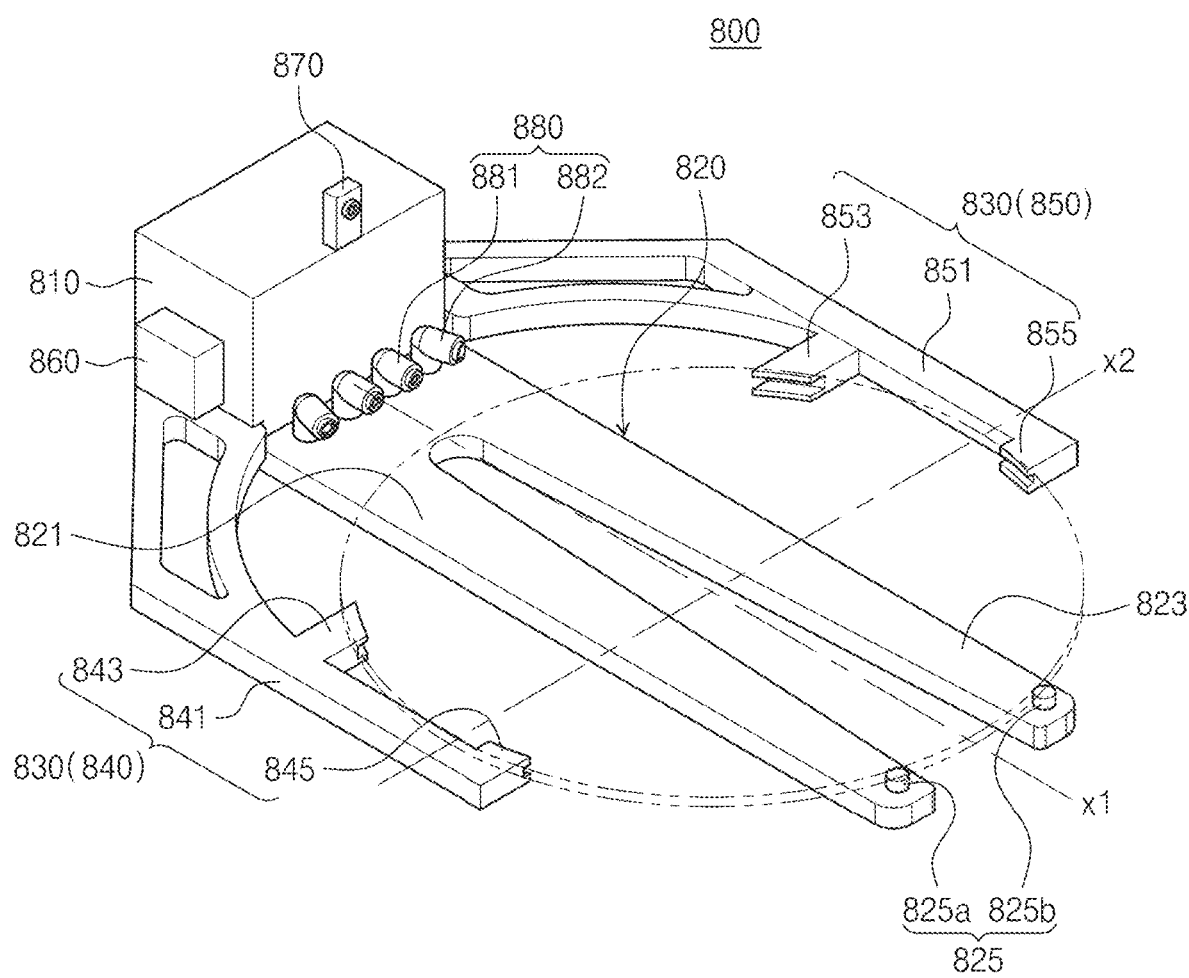
FIG. 8 is a perspective view schematically illustrating a hand of FIG. 7.

FIG. 8 is a perspective view schematically illustrating the hand of FIG. 7.

Referring to FIG. 8, the hand 800 may include a fastening body 810, a support body 820, a gripper member 830, a gripper driver 860, a vision member 870, and a liquid supply member 880.

The fastening body 810 is coupled to the fourth arm 176. The fastening body 810 may have a substantially rectangular parallelepiped shape. The fastening body 810 may be a body for coupling the support body 820 and the gripper member 830 to the joint portion 156-R. The fastening body 810 may be a body for coupling the support body 820 and the gripper member 830 to the fourth arm 176 of the joint portion 156-R. The fastening body 810 may be fastened to a rotating shaft of the fourth arm 176 of the joint portion 156-R.

The support body 820 may support a bottom surface of the substrate W. The support body 820 may support a top surface on which the pattern of the substrate W is formed, and a bottom surface of the substrate W among the bottom surface on which the pattern is not formed. That is, the substrate W may be placed on the support body 820.

The support body 820 protrudes from a front of the fastening body 810. The support body 820 may support the bottom surface of the substrate W in the first posture. The bottom surface of the substrate W may be a surface on which a pattern is not formed. If the substrate W is positioned in the second posture, the bottom surface of the substrate W contacts the support body 820.

The support body 820 includes a first support 821, a second support 823, and an alignment pin 825.

The first support 821 and the second support 823 may have the same shape and size. The first support 821 and the second support 823 are disposed to be spaced apart from each other.

The first support 821 and the second support 823 have a rod shape in which surfaces on which each substrate W is placed are flat.

The first support 821 is longer than the substrate W.

The alignment pin 825 is provided to align the position of the substrate W on the hand 800. The alignment pin 825 may function as a stopper. The alignment pin 825 is provided to the support body 820. According to an embodiment, the alignment pin 825 is provided to the first support 821 and the second support 823, respectively.

The first alignment pin 825a is positioned at an end of the first support 821. The first alignment pin 825a is provided to upwardly protrude from the first support 821.

The second alignment pin 825b is positioned at an end of the second support 823. The second alignment pin 825b is provided to upwardly protrude from the second support 823.

The gripper member 830 includes a first gripper 840 and a second gripper 850. The first gripper 840 and the second gripper 850 are symmetrically disposed to face each other around the support body 820. That is, the first gripper 840, the first support 821, the second support 823, and the second gripper 850 are sequentially positioned.

The first gripper 840 and the second gripper 850 are provided in a shape capable of gripping and supporting side surfaces of the substrate W.

The first gripper 840 has a first side plate 841, a first support protrusion 843, and a second support protrusion 845. The first side plate 841 is provided in a shape capable of gripping an end portion of the substrate W. The first side plate 841 has a body portion and a connection portion. The body portion may be provided in a lengthwise direction parallel to the support body 820. The connection portion extends from the body and is coupled to the fastening body 810. The connection portion may be provided in a rounded shape.

The first support protrusion 843 and the second support protrusion 845 are installed on an inner surface of the first side plate 841. The inner surface of the first side plate 841 is a surface facing the support body 820. The first support protrusion 843 and the second support protrusion 845 protrude from the first side plate 841 toward the support body 820 by a predetermined distance.

The second gripper 850 has a second side plate 851, a third support protrusion 853, and a fourth support protrusion 855. The second side plate 851 is provided in a shape capable of gripping an end portion of the substrate W. The second side plate 851 has a body portion and a connection portion. The body portion may be provided in a lengthwise direction parallel to the support body 820. The connection portion extends from the body and is coupled to the fastening body 810. The connection portion may be provided in a rounded shape.

The third support protrusion 853 and the fourth support protrusion 855 are installed on the inner surface of the second side plate 851. The inner surface of the second side plate 851 is a surface facing the support body 820. The third support protrusion 853 and the fourth support protrusion 855 protrude from the second side plate 851 toward the support body 820 by a predetermined distance.

Hereinafter, if the substrate W is placed in a correct position on the support body 820, the position of the substrate W on the hand is referred to as a reference position of the substrate W. The correct position is a position in which the substrate W is aligned by the alignment pin 825 on the hand.

A line through which the support body 820 is parallel to a direction protruding from the fastening body 810 and passes through the center of the substrate W placed at a reference position is referred to as a first reference axis x1.

A line perpendicular to the first reference axis x1, parallel to the substrate W placed at the reference position, and passing through the center of the substrate W placed at the reference position is referred to as a second reference axis x2.

The first support protrusion 843 is configured to protrude to a position closer to the first reference axis x1 than the second support protrusion 845, and the third support protrusion 853 is configured to protrude to a position closer to the first reference axis x1 than the fourth support protrusion 855.

The second support protrusion 845 and the fourth support protrusion 855 are positioned farther from the fastening body 810 than the first support protrusion 843 and the third support protrusion 853.

The first support protrusion 843 and the third support protrusion 853 are positioned in a region between the fastening body 810 and the second reference axis x2 (i.e., a region close to the fastening body 810 based on the second reference axis x2). In addition, the second support protrusion 845 and the fourth support protrusion 855 are positioned in a region far from the fastening body 810 with respect to the second reference axis x2.

The first support protrusion 843 and the third support protrusion 853 are spaced apart from the second reference axis x2 by the same distance.

The second support protrusion 845 and the fourth support protrusion 855 are spaced apart from the second reference axis x2 by the same distance.

A distance between the first support protrusion 843 and the third support protrusion 853 from the second reference axis x2 is farther than a distance between the second support protrusion 845 and the fourth support protrusion 855.

The lengths of the support protrusions 843, 845, 853, and 855 may all be the same or may each be different.

For example, the first support protrusion 843 and the third support protrusion 853 have the same length and the second support protrusion 845 and the fourth support protrusion 855 have the same length, but the lengths of the first support protrusion 843 and the third support protrusion 855 may be longer than the lengths of the second support protrusion 845 and the fourth support protrusion 855.

A distance between the first support protrusion 843 and the second support protrusion 845, or a distance between the third support protrusion 853 and the fourth support protrusion 855 may be determined according to various factors in a treatment process of the substrate W.

For example, if the posture change robot 156 transfers the substrate W to the standby chamber 210 to be described later, the support protrusions 843, 845, 853, 855 may be properly arranged so that the hand 800 is not interfered by the support members on the spin chuck 730 supporting the substrate W.

In addition, if the substrate W is transferred to the liquid treating chamber 230 to be described later, support protrusions 843, 845, 853, 855 may be properly arranged so that the hand 800 is not interfered by the chuck pin 446 or the support pin 444.

A groove into which an edge of the substrate W is inserted is formed at inner ends of the support protrusions 843, 845, 853, and 855 to stably grip the substrate W. A width of the groove in the vertical direction is formed to be greater than a thickness of the substrate W. The groove has a radius of curvature equal to or similar to a radius of curvature of the substrate W. In addition, a surface forming the groove may be provided to be rounded in the vertical direction. Due to this shape, the substrate W may be easily inserted into the groove, and the position of the substrate W may be aligned in the groove.

The gripper driver 860 may be fastened to the fastening body 810. The gripper driver 860 may be a driver capable of rotating the gripper member 830. The gripper driver 860 may be provided in a pair. For example, the gripper driver 860 may be provided to correspond to each of the first gripper 840 and the second gripper 850. A pair of gripper drivers 860 may rotate the first gripper 840 and the second gripper 850, respectively. The rotation axis may be a point of the fastening body 810 or the gripper member 830.

For example, the gripper member 830 may rotate between a first position at which the gripper member 830 grips the substrate W placed on the support body 820 and a second position at which the gripper member 830 is spaced apart from the substrate W placed on the support body 820.

The vision member 870 may acquire an image by imaging the substrate W and/or the support body 820. An acquired image may be transmitted to the controller 600 to be described later. The controller 600 may generate a control signal for controlling a driving of the posture change robot 156 based on an image acquired by the vision member 870.

The liquid supply member 880 may supply the wetting liquid WL to the substrate W placed on the support body 820. The wetting liquid WL may include a water. The wetting liquid WL supplied by the liquid supply member 880 may be the same kind of liquid as the treating liquid L stored in the storage spaces A and B. In addition, the wetting liquid WL supplied by the liquid supply member 880 may be the same kind of wetting liquid WL supplied by the standby chamber 210 to be described later.

The liquid supply member 880 may include a first nozzle 881 and a second nozzle 882. At least one of each of the first nozzle 881 and the second nozzle 882 may be provided. Each of the first nozzle 881 and the second nozzle 882 may be provided in a plurality. The first nozzle 881 may supply the wetting liquid WL to the first region of the substrate W placed on the support body 820. The second nozzle 882 may supply the wetting liquid WL to the second region of the substrate W placed on the support body 820. The first region and the second region may be different regions. The first region and the second region may be edge regions of the substrate W as described below. The first region may be adjacent to the first nozzle 881, and the second region may be adjacent to the second nozzle 882.

A distance between the first region and the first nozzle 881 may be shorter than a distance between the second region and the second nozzle 882. That is, a spraying distance of the wetting liquid WL supplied from the first nozzle 881 may be different from a spraying distance of the wetting liquid WL supplied from the second nozzle 882. For example, the spraying distance of the wetting liquid WL supplied from the first nozzle 881 may be shorter than the spraying distance of the wetting liquid WL supplied from the second nozzle 882.

In addition, when viewed from above, the first nozzles 881 may be disposed between the second nozzles 882. The second nozzles 882 may be disposed at a position relatively close to the gripper member 830, that is, at an outer side. The first nozzles 881 may be disposed at a position relatively far from the gripper member 830, that is, an inside.

A wetting liquid WL spray direction of the first nozzle 881 and the second nozzle 882 may be different from each other. For example, if viewed from above and with respect to an hypothetical reference line passing through a center of the substrate W and a center of the vision member 870, the first nozzle 881 may supply the wetting liquid WL in a direction parallel to the reference line, and the second nozzle 882 may supply the wetting liquid WL in a direction inclined to the reference line.

A diameter of spray holes of the first nozzle 881 and the second nozzle 882 may be different from each other. For example, the diameter of the spray hole of the first nozzle 881 may be larger than the diameter of the spray hole of the second nozzle 882. For example, a supply flow rate of the wetting liquid WL transferred to the first nozzle 881 and the second nozzle 882 per unit time may be the same. Therefore, the spraying distance of the wetting liquid WL sprayed from the first nozzle 881 may be shorter than the spraying distance of the wetting liquid WL sprayed from the second nozzle 882.

In addition, the first nozzle 881 and the second nozzle 882 may be installed on the support body 820.

The vision member 870 and the liquid supply member 880 may not be included in a configuration of the hand 800.

FIG. 9 to FIG. 13 schematically illustrate a sequential process in which the hand of FIG. 8 grips a substrate according to an embodiment of the inventive concept.

Figure 9:
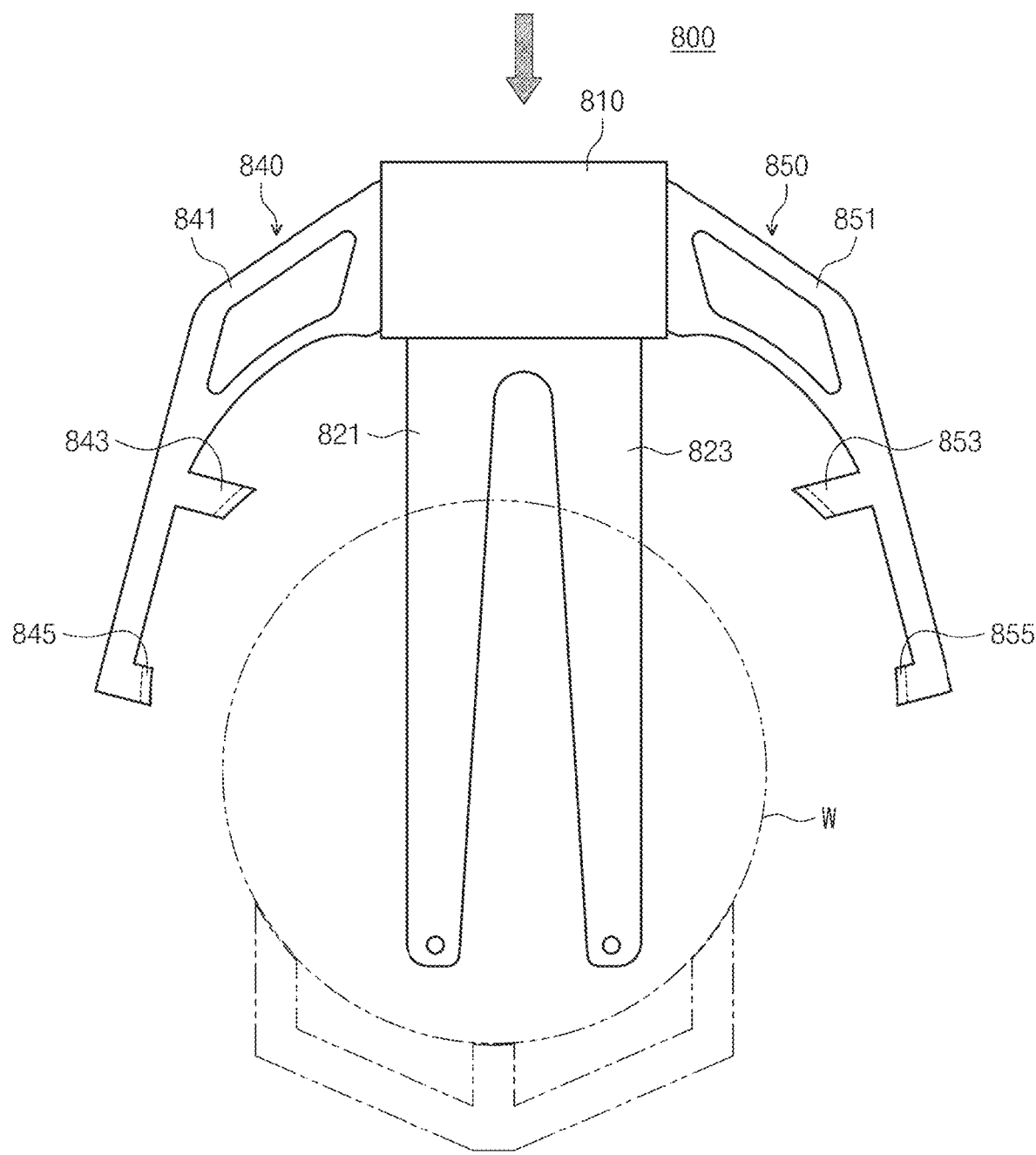
FIG. 9 to FIG. 13 schematically illustrate a sequential process in which the hand of FIG. 8 grips a substrate according to an embodiment of the inventive concept.

FIG. 9 schematically shows a state in which the hand of the posture change robot approaches one substrate W among a plurality of substrates W in a vertical state.

Referring to FIG. 9, the hand 800 may approach any one of the substrates W supported in a vertical posture by the support member 153. The hand 800 may move so that the substrate W may be positioned between the fastening body 810 and the alignment pin 825.

Figure 10:
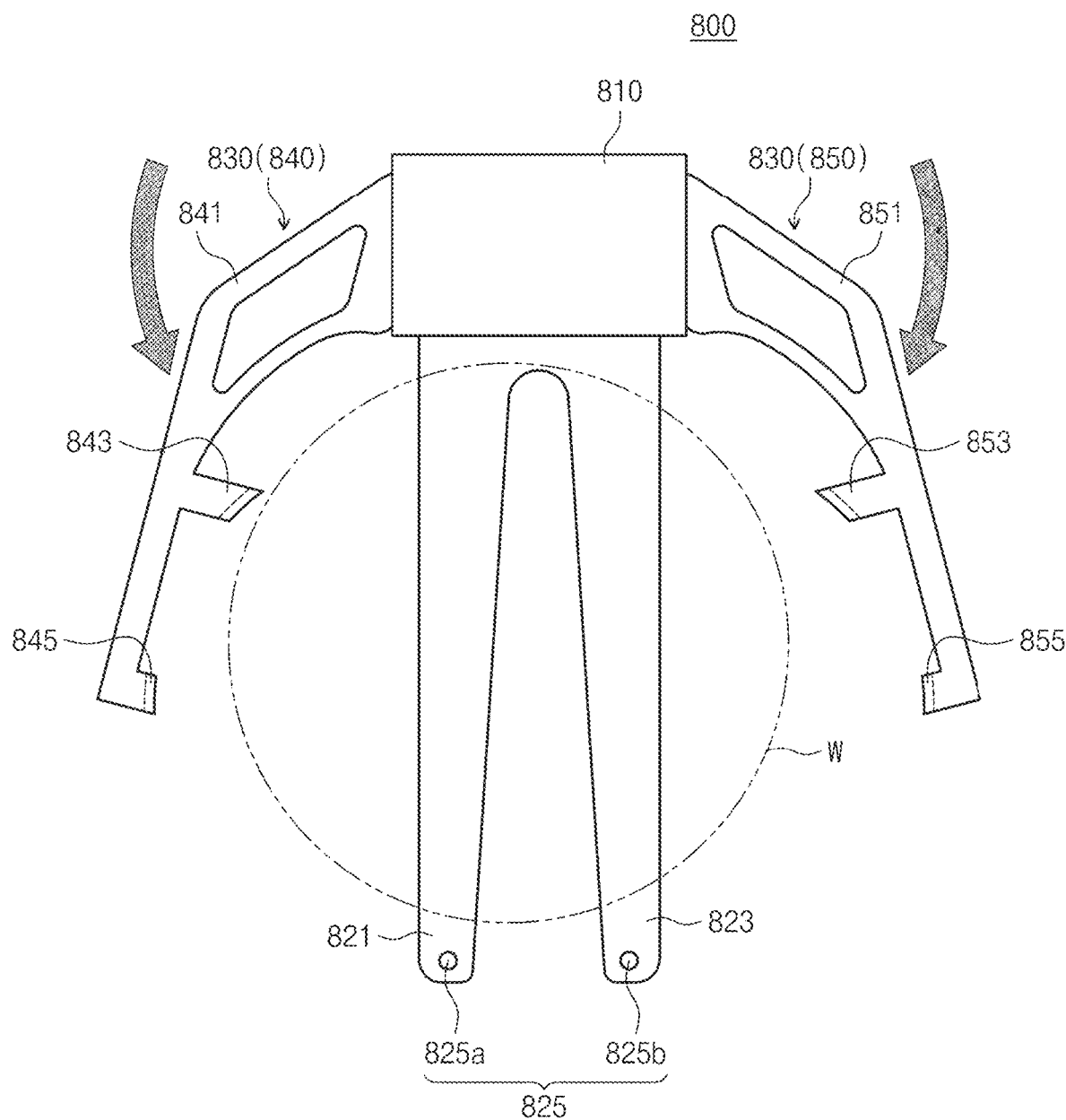

Thereafter, as shown in FIG. 10, if the substrate W is positioned between the fastening body 810 and the alignment pin 825, the gripper driver 860 rotates the gripper member 830 from the second position to the first position. The gripper member 830, that is, the first gripper 840 and the second gripper 850 may rotate in a direction of gripping the substrate W.

As the gripper member 830 continues to rotate, one of the first support protrusion 843 and the third support protrusion 853 firstly contacts the substrate W.

Figure 11:
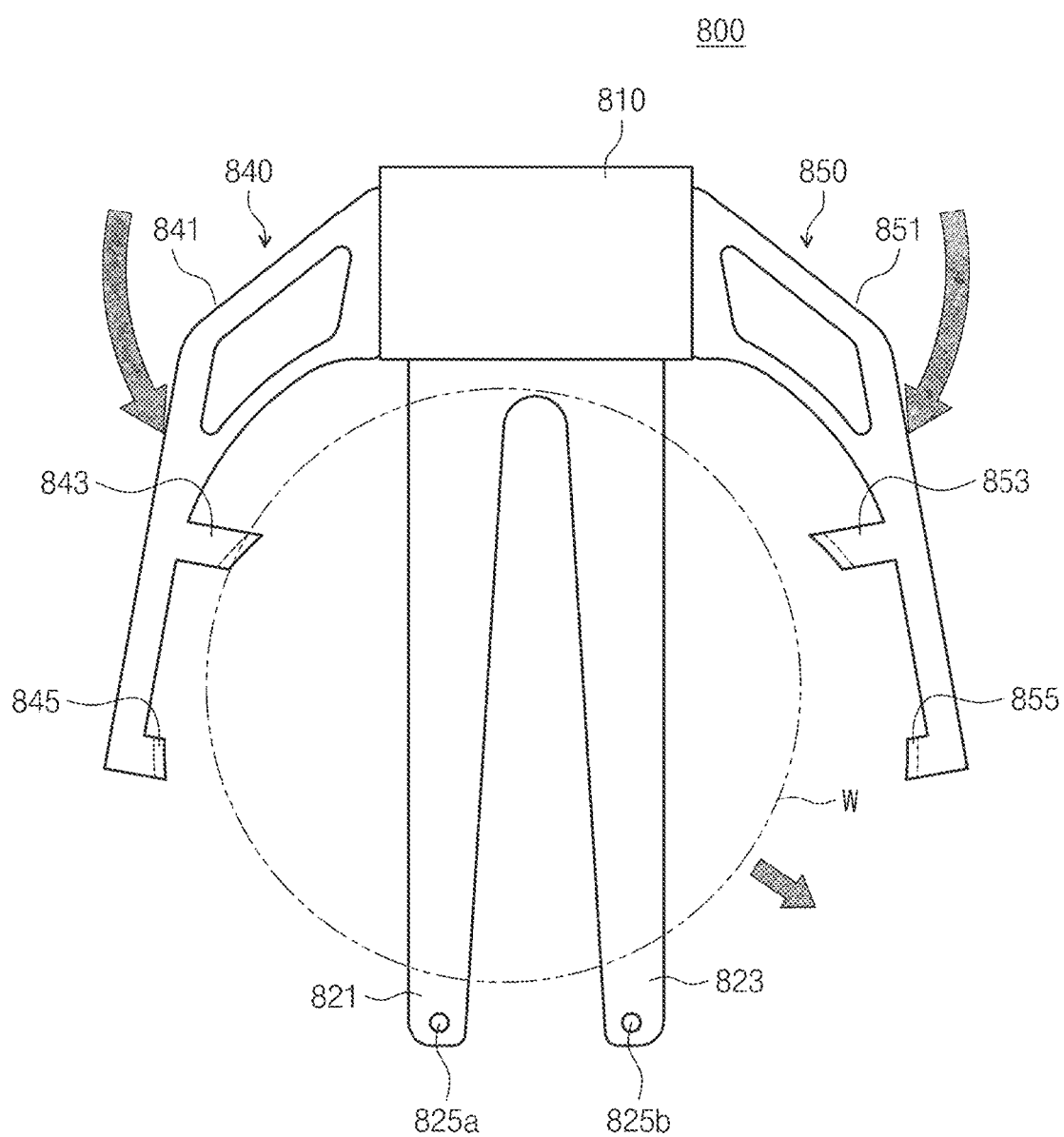

For example, as shown in FIG. 11, the first support protrusion 843 of the first gripper 840 contacts the substrate W.

An edge of the substrate W is inserted into a groove formed in the first support protrusion 843.

The gripper member 830 continuously rotates, and the first support protrusion 843 pushes the substrate W in a direction at which the third support protrusion 853 and the alignment pin 825 are.

Figure 12:
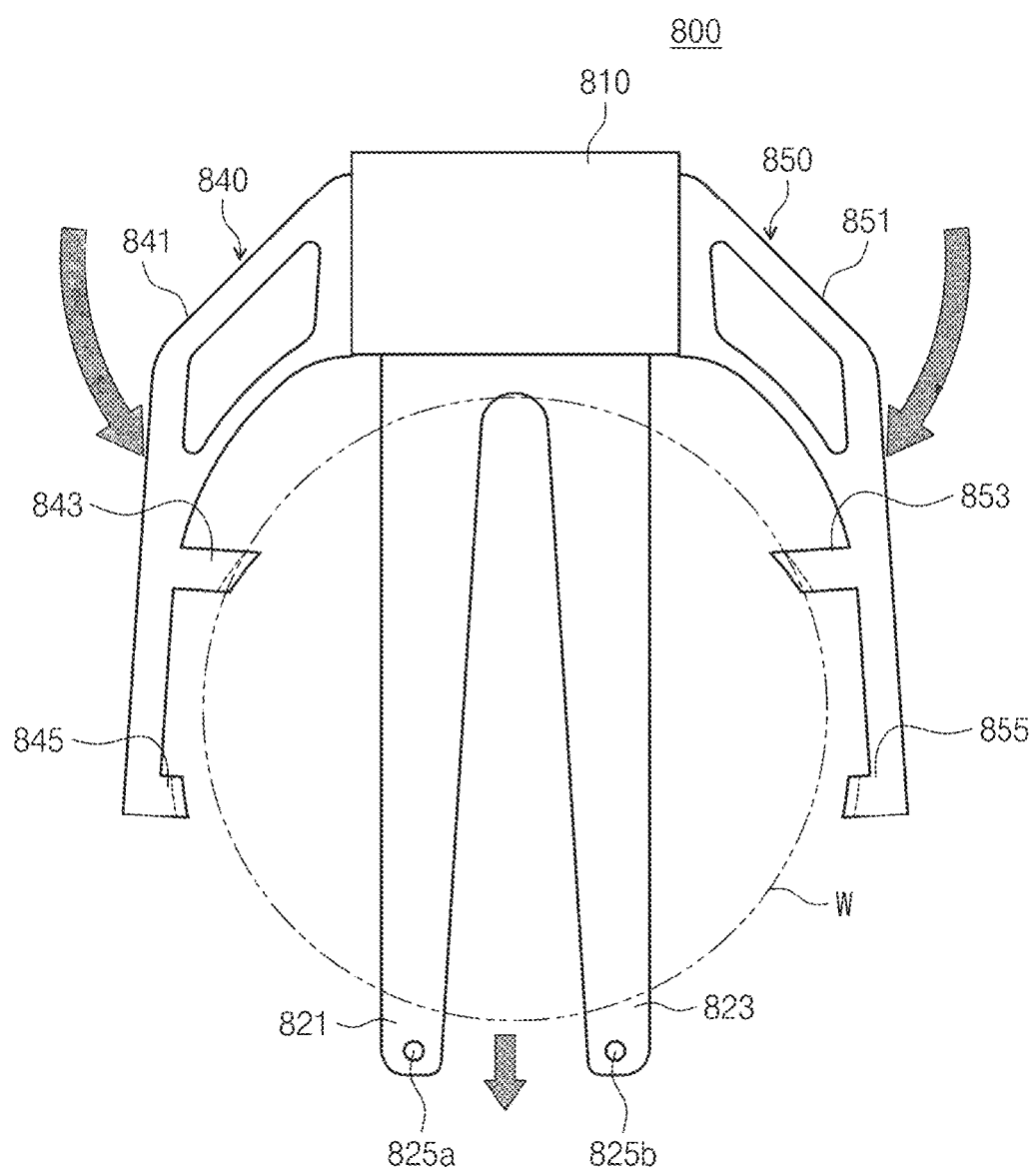

Thereafter, as shown in FIG. 12, the moved substrate W is in contact with the third support protrusion 853. An edge of the substrate W is inserted into the groove formed in the third support protrusion 853. The substrate W is gripped by the first support protrusion 843 and the third support protrusion 853.

The gripper member 830 continuously rotates, and the first support protrusion 843 and the third support protrusion 853 push the substrate W in the direction in which the alignment pin 825.

Figure 13:
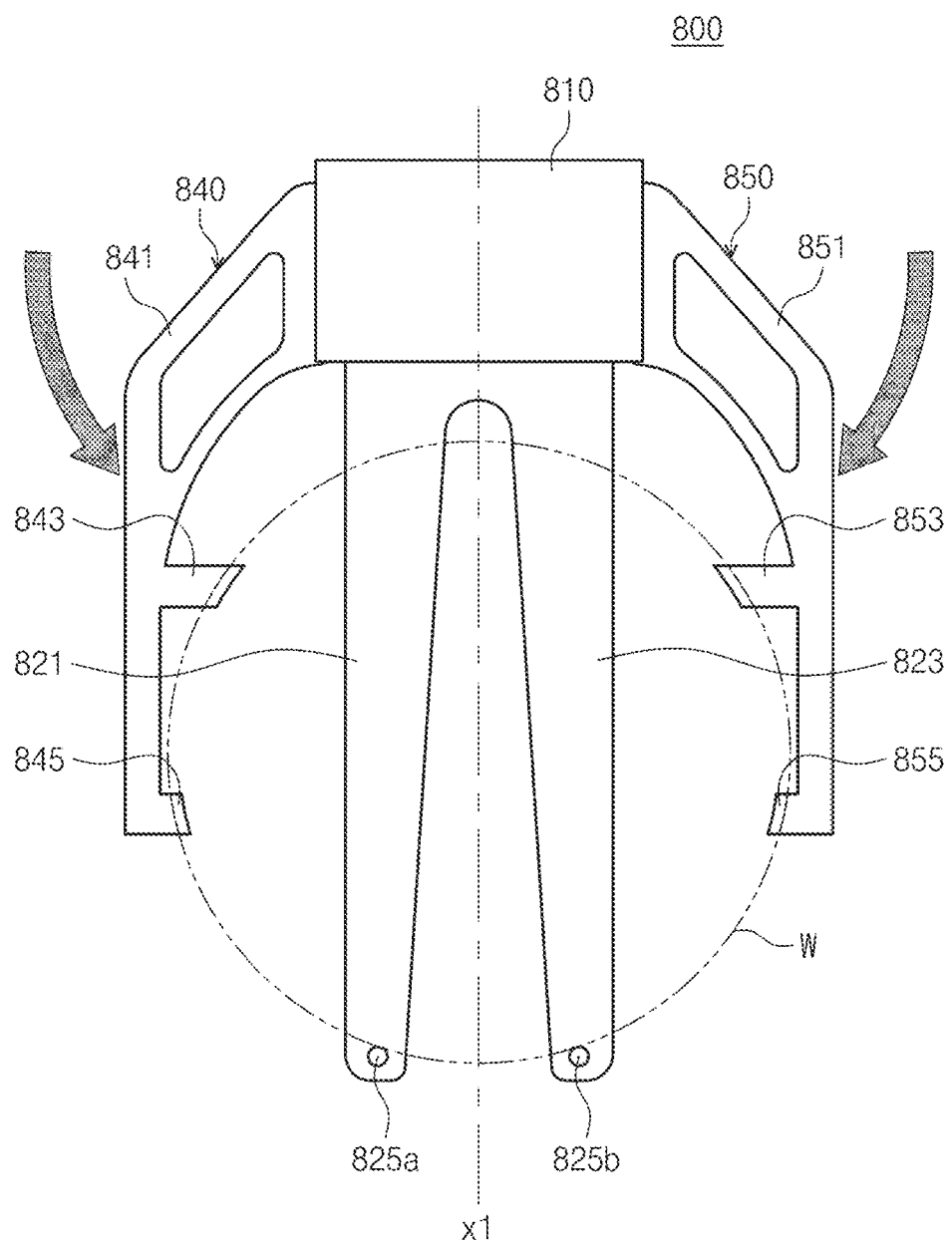

Then, as shown in FIG. 13, the substrate W that was pushed and moved stops moving if its side surface contacts the alignment pin 825, and the second support protrusion 845 and the fourth support protrusion 855 contact the substrate W if the substrate W contacts the alignment pin 825.

An edge of the substrate W is inserted into grooves formed in the second support protrusion 845 and the fourth support protrusion 855.

The gripper driver 860 ends a rotation of the gripper member 830 which has reached the first position.

The substrate W is aligned with the reference position.

The substrate W is stably gripped by the first support protrusion 843, the second support protrusion 845, the third support protrusion 853, the fourth support protrusion 855, the first alignment pin 825a, and the second alignment pin 825b.

In this way, if a method of sequentially contacting the support protrusions 843, 845, 853, and 855 with the substrate W by a rotational motion of the gripper member 830 is used, the substrate W can be stably fixed to the reference position.

That is, a shaking such as rolling and pitching of the substrate W that may occur in the process of gripping or returning the substrate W after gripping it can be minimized.

In particular, if the substrate W is gripped while the substrate W is immersed in the treating liquid L, the treating liquid L may flow due to a movement of the hand 800, a supply or a drainage of the treating liquid L, causing a shaking of the substrate W and a cause a problem of an error of an alignment of the substrate W. The inventive concept can minimize this problem by aligning and fixing the substrate W at a specific position.

In the above embodiment, the first support protrusion 843 and the third support protrusion 853 contact the substrate W before the second support protrusion 845 and the fourth support protrusion 855, but the inventive concept is not limited thereto. Depending on a shape or a length of the gripper member 830, that is, the shape or length, etc of each side plate 841 and 851 or the support protrusions 843, 845, 853, 855, according to which the support protrusions 843, 845, 853, and 855 contact the substrate W, an order or shape of which the support protrusions 843, 845, 853, and 855 contact the substrate W, a movement path of the substrate W, or a position at which the substrate W is fixed may vary.

For example, by lengthening or shortening protrusion lengths of the first support protrusion 843 and the third support protrusion 853, a time point at which the first support protrusion 843 and the third support protrusion 853 contact the substrate W may be changed.

In addition, by lengthening or shortening protrusion lengths of the second support protrusion 845 and the fourth support protrusion 855, a time point at which the second support protrusion 845 and the fourth support protrusion 855 contact the substrate W may be changed.

In the above embodiment, the support body 820 contains the first support 821 and the second support 823, but the inventive concept is not limited to it. A configuration or a shape of the support body 820 may be variously modified. For example, the support body 820 may be formed as one support.

The embodiment is illustrated as gripping the substrate W immersed in the treating liquid L in the posture change treating bath 151, but is not limited thereto. The same configuration may be applied even if the substrate W which is not immersed in the treating liquid L is gripped.

In addition, the hand 800 is illustrated as a hand of the posture change robot 156, but is not limited thereto. For example, the same configuration may be applied to a hand of the first transfer robot 222 or the second transfer robot 262, and the same configuration may be applied to a transfer robot gripping the substrate W.

In the above-described example, it has been described that the first gripper 840 and the second gripper 850 rotate between the first position and the second position. However, in contrast, the first gripper and the second gripper may be moved between the first position and the second position by a linear movement.

Figure 14:
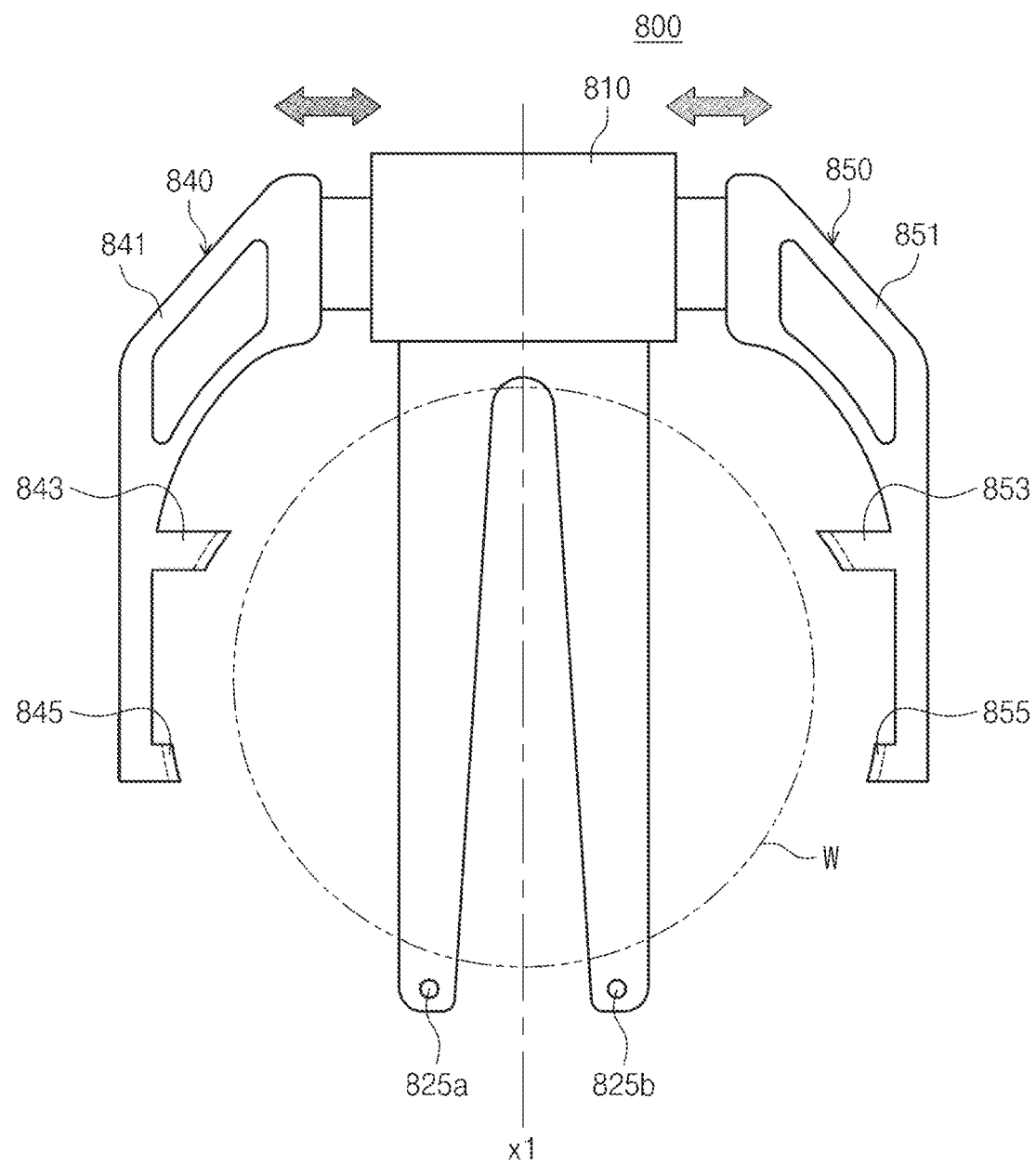
FIG. 14 schematically illustrates a state in which the hand of FIG. 8 grips the substrate according to another embodiment of the inventive concept.

FIG. 14 schematically illustrates a state in which the hand of FIG. 8 grips the substrate according to another embodiment of the inventive concept. The first gripper and the second gripper may be moved between the first position and the second position by the linear movement. The gripper driver 860 may be a driver capable of linearly moving the gripper member 830. The gripper driver 860 may be provided in a pair. For example, the gripper driver 860 may be provided to correspond to each of the first gripper 840 and the second gripper 850. The pair of gripper drivers 860 may linearly move the first gripper 840 and the second gripper 850, respectively.

Referring back to FIG. 1, the second process treating unit 200 may treat the substrate W treated by the first process treating unit 100. The second process treating unit 200 may treat the substrate W treated by the first treating unit 100, and may liquid treat or dry treat the substrate W in single-type manner.

The second process treating unit 200 may include a standby chamber 210, a first transfer chamber 220, a single-type liquid treating chamber 230, a drying chamber 240, a buffer unit 250, a second transfer chamber 260, and a second load port unit 270. Both the single-type liquid treating chamber 230 and the drying chamber 240 may be provided as single-type treating chambers which treating one substrate W at a time.

The first transfer chamber 220 is arranged with its lengthwise direction in the first direction. The liquid treating chamber 230 and the drying chamber 240 is disposed at a side of the first transfer chamber 220. The liquid treating chamber 230 and the drying chamber 240 are disposed along the first direction. A plurality of liquid treating chambers 230 are provided, and they may be stacked in the vertical direction. In addition, a plurality of drying chambers 240 are provided, and they may be stacked in the vertical direction. According to an embodiment, the drying chamber 240 is disposed closer to the first process treating unit 100 than the liquid treating chamber 230. The standby chamber 210 and the buffer unit 250 are disposed on the other side of the first transfer chamber 220. The standby chamber 210 and the buffer unit 250 are arranged along the first direction. The standby chamber 210 is disposed closer to the first process treating unit 100 than the buffer unit 250.

The second transfer chamber 260 is disposed on an opposite side to the first transfer chamber 220 with respect to the standby chamber 210 and the buffer unit 250. In addition, the second load port unit 270 is disposed on a side of the first transfer chamber 220. Due to the above-described arrangement, the drying chamber 240, the first transfer chamber 220, the standby chamber 210, the second transfer chamber 260, and the second load port unit 270 are sequentially arranged in the second direction.

The standby chamber 210 may provide a storage space for temporarily storing the substrate W. In the standby chamber 210, substrates W treated in the batch-type treating bath 140 may be posture changed by the posture change robot 156 in the posture change unit 150 and may be disposed on a transfer path of the substrate W transferred to the single-type treating chambers 230, 240. That is, the buffer chamber 210 may be disposed on the transfer path of the substrate W transferred between the batch-type treating baths 140 and the single-type treating chambers 230 and 240.

The standby chamber 210 temporarily stores the substrate W. In addition, the standby chamber 210 maintains a wet state of the substrate W transferred by the posture change robot 156.

Figure 15:
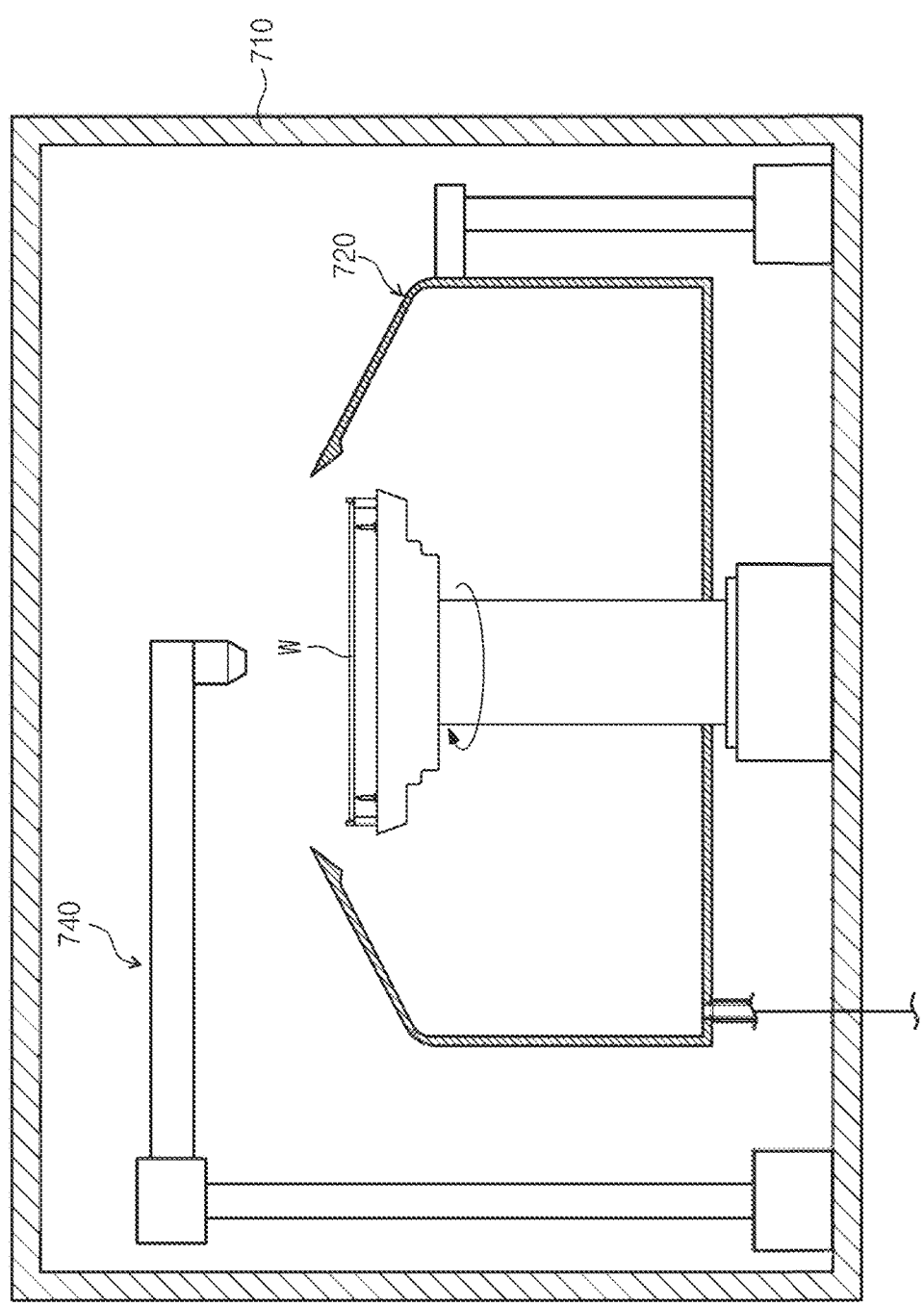
FIG. 15 schematically illustrates a standby chamber of FIG. 1.

FIG. 15 schematically illustrates the standby chamber of FIG. 1.

According to an embodiment, the standby chamber 210 has a housing 710, a cup 720, a spin chuck 730, and a liquid supply unit 740.

The spin chuck 730 supports the substrate W. The substrate W is placed on the spin chuck 730 in a state parallel to the ground. The spin chuck 730 is provided to be rotatable based on its central axis. The liquid supply unit 740 supplies a wetting liquid to the substrate W supported by the spin chuck 730. The cup 720 is disposed to surround the spin chuck 730 in the housing 710. The cup 720 prevents a liquid from scattering to an entire region within the housing 710 while the liquid is supplied to the rotating substrate W.

While the substrate W stands by in the standby chamber 210, the wetting liquid is supplied from the liquid supply unit 740 to the substrate W to maintain the liquid film of the wetting liquid on the substrate W. This prevents the substrate W from being naturally dried before the substrate W is transferred to the single-type transfer chambers 230 and 240.

The substrate W on which the liquid film is formed may be taken out from the standby chamber 210 by a first transfer robot 222 to be described later. The substrate W taken out from the standby chamber 210 may be transferred to the single-type treating chambers 230 and 240 by the first transfer robot 222 to the single-type treating chambers 230 and 240.

The first transfer chamber 220 may include a first transfer robot 222 and a transfer rail 223. The first transfer robot 222 may move along the first transfer rail 223. A lengthwise direction of the transfer rail 223 may be parallel to the first direction X.

The single-type liquid treating chamber 230 may rotate the substrate W in a horizontal posture, but may supply the treating liquid to the rotating substrate W to treat the substrate W. The single-type liquid treating chamber 230 may treat the substrate W one by one. The treating liquid supplied from the single-type liquid treating chamber 230 may be an organic solvent. For example, the treating liquid supplied from the single-type liquid treating chamber 230 may be an isopropyl alcohol (IPA). In the single-type liquid treating chamber 230, the organic solvent may be supplied to the rotating substrate W, and the substrate W may be dried by rotating the substrate W. In contrast, the single-type liquid treating chamber 230 supplies the organic solvent to the rotating substrate W, and is transferred to the drying chamber 240 described later while the substrate W is wet with the organic solvent, so that the substrate W may be dried in the drying chamber 240.

Figure 16:
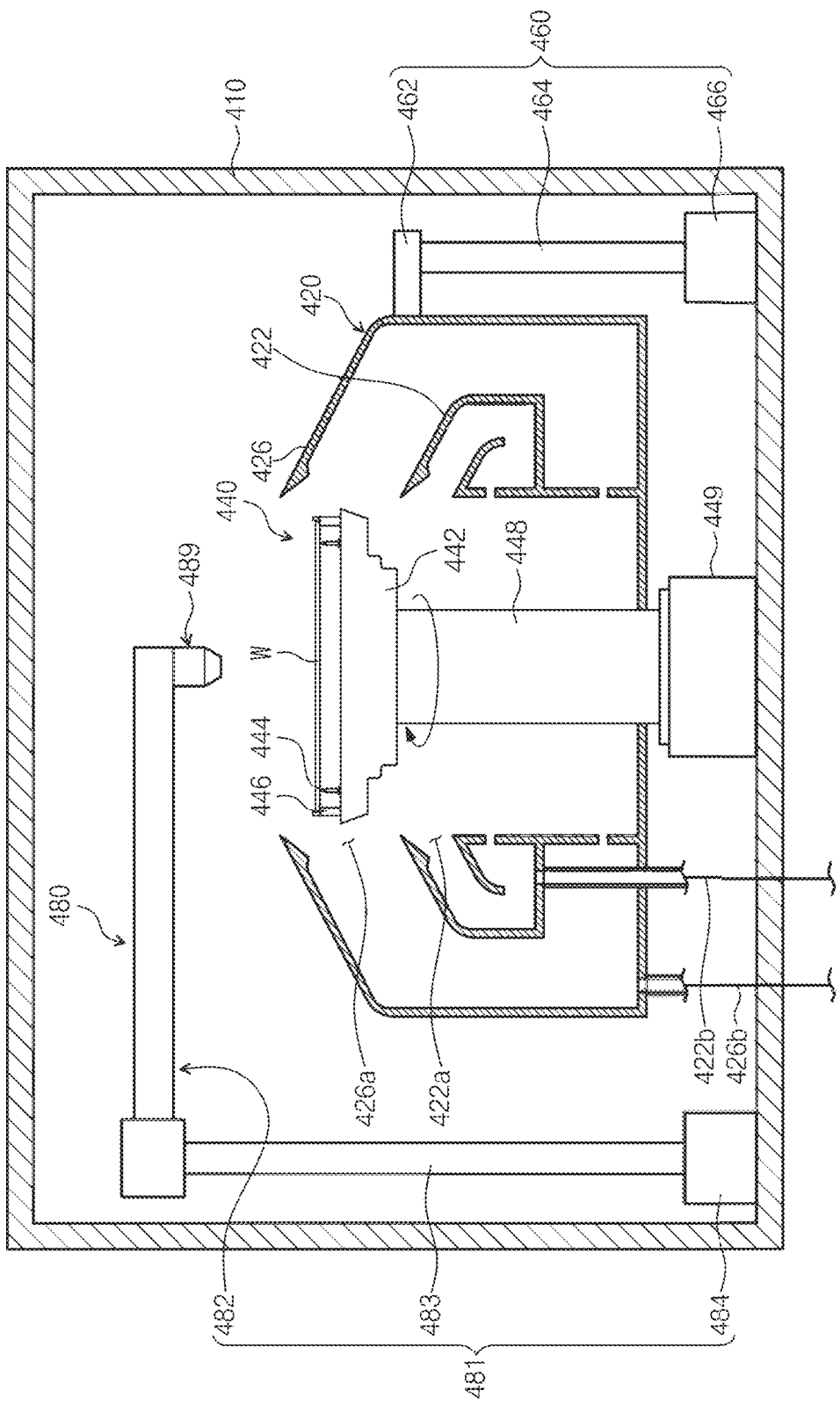
FIG. 16 schematically illustrates a liquid treating chamber of FIG. 1.

FIG. 16 schematically illustrates the liquid treating chamber 230 of FIG. 1.

Referring to FIG. 16, the liquid treating chamber 230 may include a housing 410, a cup 420, a support unit 440, a lifting/lowering unit 460, and a liquid supply unit 480.

The housing 410 has a treating space 412 therein. The housing 410 may have a container shape having a space therein. The treating space 412 of the housing 410 may be provided with a cup 420, a support unit 440, a lifting/lowering unit 460, and a liquid supply unit 480. The housing 410 may have a rectangular shape when viewed from a front cross section. However, the inventive concept is not limited thereto, and the housing 410 may be transformed into various shapes that may have a treating space 412.

The cup 420 has a container shape with an open top. The cup 420 has an inner recollecting container 422 and an outer recollecting container 426. Each of the recollecting containers 422 and 426 recollects different treating liquids from among the treating liquids used in the process. The inner recollecting container 422 is provided in an annular ring shape surrounding the substrate support unit 440, and the outer recollecting container 426 is provided in an annular ring shape surrounding the inner recollecting container 422. The inner space 422a and the inner recollecting container 422 of the inner recollecting container 422 function as the first inlet 422a through which the treating liquid flows into the inner recollecting container 422. A space 426a between the inner recollecting container 422 and the outer recollecting container 426 functions as a second inlet 426a through which the treating liquid flows into the outer recollecting container 426. According to an embodiment, each of the inlet 422a and 426a may be positioned at different heights. The recollecting lines 422b and 426b are connected below the bottom surfaces of each of the recollecting containers 422 and 426. The treating liquids which are introduced into each of the recollecting containers 422 and 426 may be provided to an outer treating liquid regeneration system (not shown) through the recollecting lines 422b and 426b and reused.

The support unit 440 supports the substrate W in the treating space 412. The support unit 440 supports and rotates the substrate W during the process. The support unit 440 has a support plate 442, a support pin 444, a chuck pin 446, and rotation driving members 448 and 449.

The support plate 442 is generally provided in a circular plate shape and has a top surface and a bottom surface. The bottom surface has a smaller diameter than the top surface. That is, the support plate 442 may have a shape of a wide top surface and a narrow bottom surface. The top and bottom surfaces are positioned so that their central axes coincide with each other. In addition, a heating means (not shown) may be provided on the support plate 442. The heating means provided to the support plate 442 may heat the substrate W placed on the support plate 442. The heating means may generate a heat. The heat generated by the heating means may be warm or cold. The heat generated by the heating means may be transferred to the substrate W placed on the support plate 442. In addition, the heat transferred to the substrate W may heat the treating liquid supplied to the substrate W. The heating means may be a heater and/or a cooling coil. However, the inventive concept is not limited thereto, and the heating means may be variously modified into a known device.

A plurality of support pins 444 are provided. The support pins 444 are disposed to be spaced apart from an edge of the top surface of the support plate 442 at a predetermined interval and upwardly protrude from the support plate 442. The support pins 444 are disposed to have an annular ring shape as a whole by a combination with each other. The support pin 444 supports a rear edge of the substrate W such that the substrate W is spaced apart from a top surface of the support plate 442 by a predetermined distance.

A plurality of chuck pins 446 are provided. The chuck pin 446 is disposed to be farther from a center of the support plate 442 than the support pin 444. The chuck pin 446 is provided to upwardly protrude from the top surface of the support plate 442. The chuck pin 446 supports a side of the substrate W so that the substrate W does not deviate from a correct position in a lateral direction when the support plate 442 is rotated. The chuck pin 446 is provided to be able to move linearly between an outer position and an inner position along a radial direction of the support plate 442. The outer position is a position far from a center of the support plate 442 compared to the inner position. If the substrate W is loaded or unloaded on the support plate 442, the chuck pin 446 is positioned at the outer position, and if the process is performed on the substrate W, the chuck pin 446 is positioned at the inner position. The inner position is a position at which the side parts of the chuck pin 446 and the substrate W contact each other, and the outer position is a position at which the chuck pin 446 and the substrate W are spaced apart from each other.

The rotation driving members 448 and 449 rotate the support plate 442. The support plate 442 may be rotated about a magnetic center axis by the rotation driving members 448 and 449. The rotation driving members 448 and 449 include a support shaft 448 and a driving unit 449. The support shaft 448 has a container shape. A top end of the support shaft 448 is fixedly coupled to the bottom surface of the support plate 442. According to an embodiment, the support shaft 448 may be fixedly coupled to the center of the bottom surface of the support plate 442. The driving unit 449 provides a driving force to rotate the support shaft 448. The support shaft 448 may be rotated by the driving unit 449, and the support plate 442 may be rotated together with the support shaft 448.

The lifting/lowering unit 460 linearly moves the cup 420 in the vertical direction. As the cup 420 moves up and down, a relative height of the cup 420 with respect to the support plate 442 is changed. In the lifting/lowering unit 460, the cup 420 is lowered so that the support plate 442 protrudes above the cup 420 when the substrate W is loaded or unloaded on the support plate 442. In addition, if the process proceeds, a height of the cup 420 is adjusted so that the treating liquid can flow into a preset recollecting container 422, 426 according to the type of the treating liquid supplied to the substrate W. The lifting/lowering unit 460 has a bracket 462, a moving shaft 464, and a driver 466. The bracket 462 is fixedly installed on an outer wall of the cup 420, and the moving shaft 464, which is moved in the vertical direction by the driver 466, is fixedly coupled to the bracket 462. Selectively, the lifting/lowering unit 460 may move the support plate 442 in the vertical direction.

The liquid supply unit 480 may supply the treating liquid to the substrate W. The treating liquid may be an organic solvent, a chemical or a rinsing liquid described above. The organic solvent may be an isopropyl alcohol (IPA) liquid.

The liquid supply unit 480 may include a moving member 481 and a nozzle 489. The moving member 481 moves the nozzle 489 to a process position and a standby position. The process position is a position at which the nozzle 489 faces the substrate W supported by the support unit 440. According to an embodiment, the process position is a position at which the treating liquid is discharged to a top surface of the substrate W. Also, the process position also includes a first supply position and a second supply position. The first supply position may be a position closer to the center of the substrate W than the second supply position, and the second supply position may be a position including an end part of the substrate W. Selectively, the second supply position may be a region adjacent to the end of the substrate W. The standby position is defined as a position at which the nozzle 489 is out of the process position. According to an embodiment, the standby position may be a position at which the nozzle 489 stands by before or after a process treatment is completed on the substrate W.

The moving member 481 includes an arm 482, a support shaft 483, and a driver 484. The support shaft 483 is positioned on a side of the cup 420. The support shaft 483 has a rod shape in which a lengthwise direction thereof faces the fourth direction. The support shaft 483 is provided to be rotatable by the driver 484. The support shaft 483 is provided to be movable up and down. The arm 482 is coupled to the top end of the support shaft 483. The arm 482 vertically extends from the driver 484. A nozzle 489 is coupled to an end of the arm 482. As the support shaft 483 is rotated, the nozzle 489 may swing together with the arm 482. The nozzle 489 may be swing-moved to the process position and the standby position. Selectively, the arm 482 may be provided to be forwardly and backwardly movable in the lengthwise direction thereof. A path through which the nozzle 489 moves when viewed from above may coincide with the central axis of the substrate W at the process position.

The drying chamber 240 may remove the organic solvent remaining on the substrate W by using the drying fluid G in a supercritical state. The drying chamber 240 may be a high-pressure chamber which removes the organic solvent remaining on the substrate W using a supercritical fluid. The drying fluid may be a carbon dioxide ($CO_2$).

The substrate W treated in the single-type treating chambers 230 and 240 may be transferred to the buffer unit 250 by the first transfer robot 222. The buffer unit 250 may be disposed between the first transfer chamber 220 and the second transfer chamber 260. The buffer unit 250 may be disposed between the single-type treating chambers 230 and 240 and the second load port unit 270.

The buffer unit 250 may provide a space in which the substrate W is temporarily stored similarly to the standby chamber 210. For example, the buffer unit 250 may temporarily store the substrate W treated in the single-type liquid treating chamber 230 and/or the single-type drying chamber 240 which are single-type treating chambers.

The second transfer chamber 260 may be disposed between the buffer unit 250 and the second load port unit 270. A second transfer robot 262 may be provided in the second transfer chamber 260. The second transfer robot 262 may complete the treatment and transfer the substrate W stored in the buffer unit 250 to the transfer container F.

The hand of the second transfer robot 262 may be a single-type hand for transferred the substrate W one by one. A transfer hand of the second transfer robot 262 may be provided to be movable along the first direction X, the second direction Y, and the third direction Z. In addition, the transfer hand of the second transfer robot 262 may be rotatably provided with the third direction Z as a rotation axis.

The second load port unit 270 may include at least one load port. A transfer container F capable of storing a plurality of substrates W may be placed on the load port of the second load port unit 270. For example, the transfer container F placed in the second load port unit 270 may store substrates W treated by the first process treating unit 100 and the second process treating unit 200. The transfer container F placed in the second load port unit 270 may store only the substrates W on which a treatment has been completed in the first process treating unit 100 and the second process treating unit 200. That is, the second load port unit 270 may perform a function of unloading the treated substrate W from the substrate treating apparatus.

The second transfer robot 262 described above may take the treated substrate W into the container F placed in the load port of the second load port unit 270. The container F may be transferred to an outside of the substrate treating apparatus 10 by the above-described article transfer apparatus (e.g., OHT).

The controller 600 may control the substrate treating apparatus 10. For example, the controller 600 may control components of the substrate treating apparatus 10. For example, the controller 600 may control the substrate treating apparatus 10 so that the substrate treating apparatus 10 may perform a process of treating the substrate W.

For example, the controller 600 may control at least one of the first load port unit 110, the index chamber 120, the transfer unit 130, the batch-type treating unit 140, the posture change portion 150, the buffer chamber 210, the first transfer chamber 220, the single-type liquid treating chamber 230, the single-type drying chamber 240, and the second transfer chamber 260.

The controller 600 may comprise a process controller consisting of a microprocessor (computer) that executes a control of the substrate treating apparatus 10, a user interface such as a keyboard via which an operator inputs commands to manage the substrate treating apparatus 10, and a display showing the operation situation of the substrate treating apparatus, and a memory unit storing a treating recipe, i.e., a control program to execute treating processes of the substrate treating apparatus 10 by controlling the process controller or a program to execute components of the substrate treating apparatus 10 according to data and treating conditions. In addition, the user interface and the memory unit may be connected to the process controller. The treating recipe may be stored in a storage medium of the storage unit, and the storage medium may be a hard disk, a portable disk, such as a CD-ROM or a DVD, or a semiconductor memory, such as a flash memory.

Figure 17:
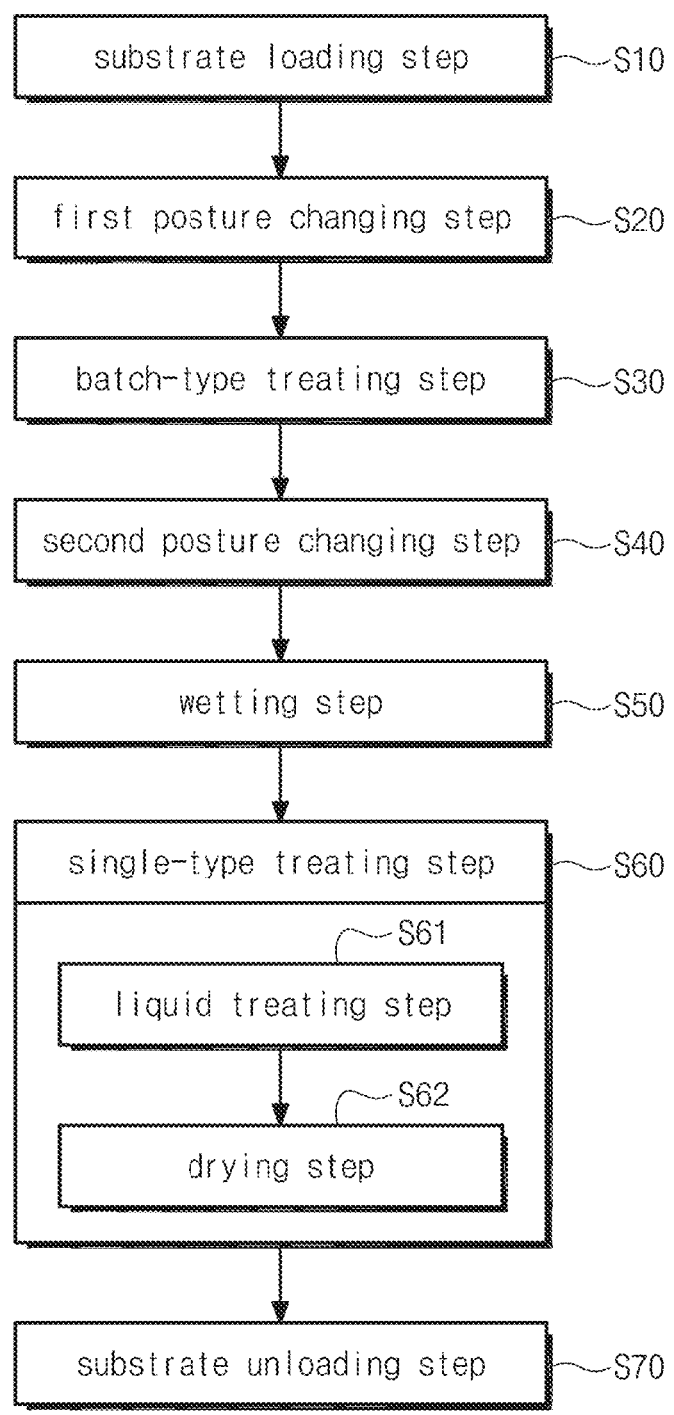
FIG. 17 is a flowchart illustrating a substrate treating method according to an embodiment of the inventive concept.

FIG. 17 is a flowchart illustrating a substrate treating method according to an embodiment of the inventive concept.

Referring to FIG. 17, the substrate treating method according to an embodiment of the inventive concept may include a substrate loading step S10, a first posture changing step S20, a batch-type treating step S30, a second posture changing step S40, a wetting step S50, a single-type treating step S60, and a substrate unloading step S70.

In the substrate loading step S10, a so-called substrate W in an untreated state, which requires a treatment, may be loaded on the substrate treating apparatus 10. In the substrate loading step S10, the transfer container F may be placed on the first load port unit 110.

The substrate W stored in the transfer container F may be taken out by the index robot 122 and transferred to the storage container C.

In the first posture change step S20, the posture of the substrate W may be changed from a horizontal posture to a vertical posture. In the first posture change step S20, the posture of the substrate W may be changed as the storage container C rotates in the first direction X around the axis by the posture change unit 124. The posture change unit 124 may have a rotation shaft capable of rotating the storage container C in the first direction X as an axis. In the first posture change step S20, postures of the plurality of substrates W may be changed at once.

The substrate W changed to the vertical posture may be transferred to the first batch-type treating unit 141 by the first transfer unit 132.

In the batch-type treating step S30, a liquid treatment may be performed on the plurality of substrates W in the vertical posture. In the batch-type treating step S30, the substrates W may be transferred to at least one of the batch-type treating baths 141 to 143 to perform the liquid treatment on the substrate W. The batch-type treating step S30 may be performed in a manner in which the substrate is pre-treated at the first batch-type treating unit 141 and post-treated at the second batch-type treating unit 142 or the third batch-type treating unit 143.

For example, the substrate W transferred to the first batch-type treating unit 141 may be liquid-treated in the first chemical bath 141a, and may be rinse treated in the first rinsing bath 141b. The substrate W which is liquid-treated in the first chemical bath 141a and/or the first rinsing bath 141b may be transferred to any one of the treating units selected from the second batch-type treating unit 142 or the third batch-type treating unit 143. In the chemical bath 141a, the substrate W may be treated with a chemical such as a DHF (an embodiment of a first chemical), and in the first rinsing bath 141-B2, the substrate W may be treated with a rinsing liquid such as a water.

For example, if the substrate W is transferred to the second batch-type treating unit 142, the substrate W may be treated firstly by a chemical containing a phosphoric acid (an embodiment of a second chemical) in the second chemical bath 142a, and then by a rinse-treated by a rinsing liquid containing a water in the second rinsing bath 142b.

The rinse-treated substrates W may be transferred to the posture change treating bath 151 by the second transfer unit 134.

The second posture changing step S40 may be performed by the posture change portion 150. The second posture changing step S40 may include a grip step of gripping the substrate W and a rotation step of changing the posture of the substrate W. In the second posture changing step S40, the posture of the substrate W may be changed one by one.

Figure 18:
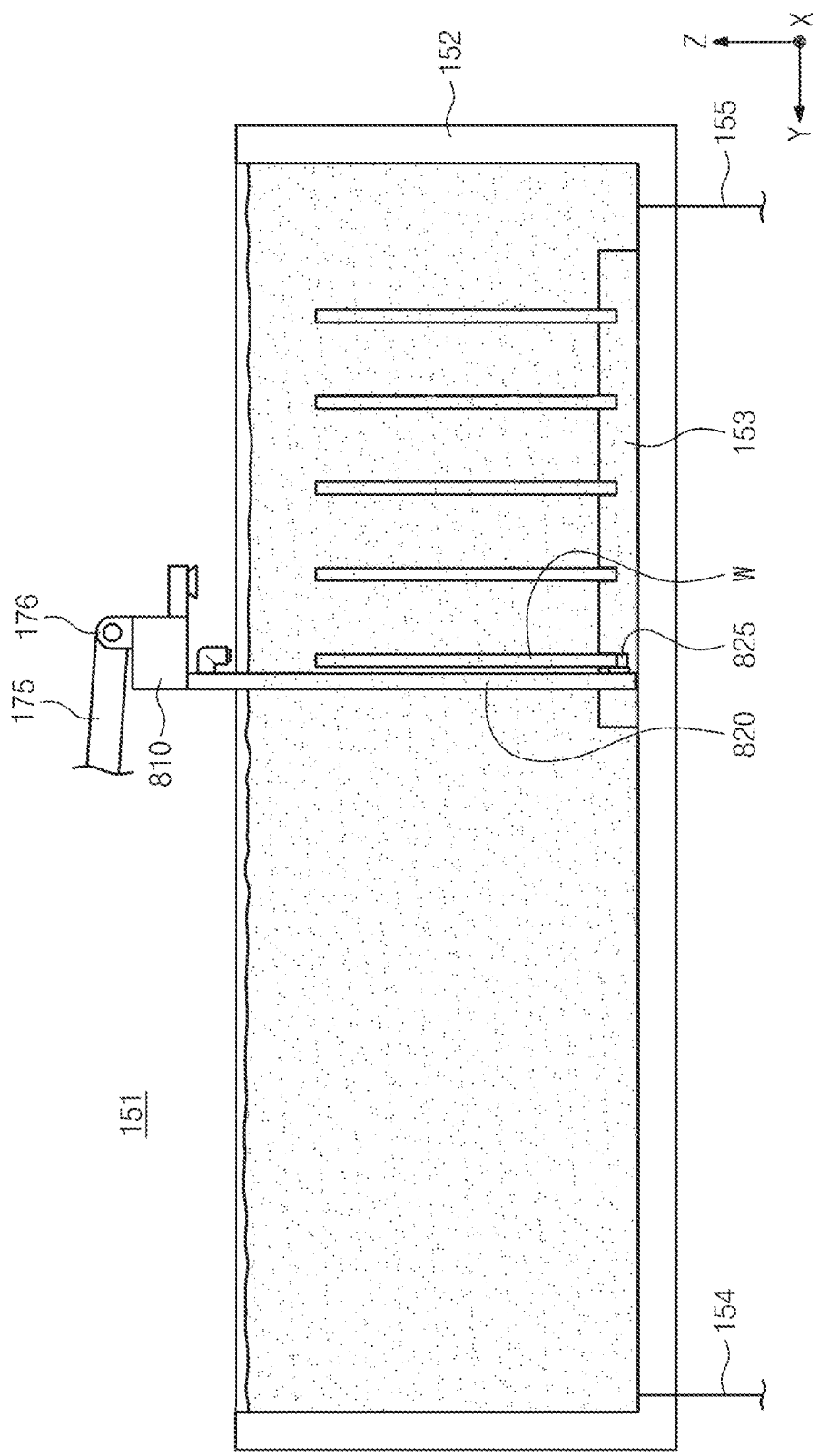
FIG. 18 and FIG. 19 illustrate a state in which the posture change robot changes a posture of the substrate to a horizontal posture in a second posture change step of FIG. 17.
Figure 19:
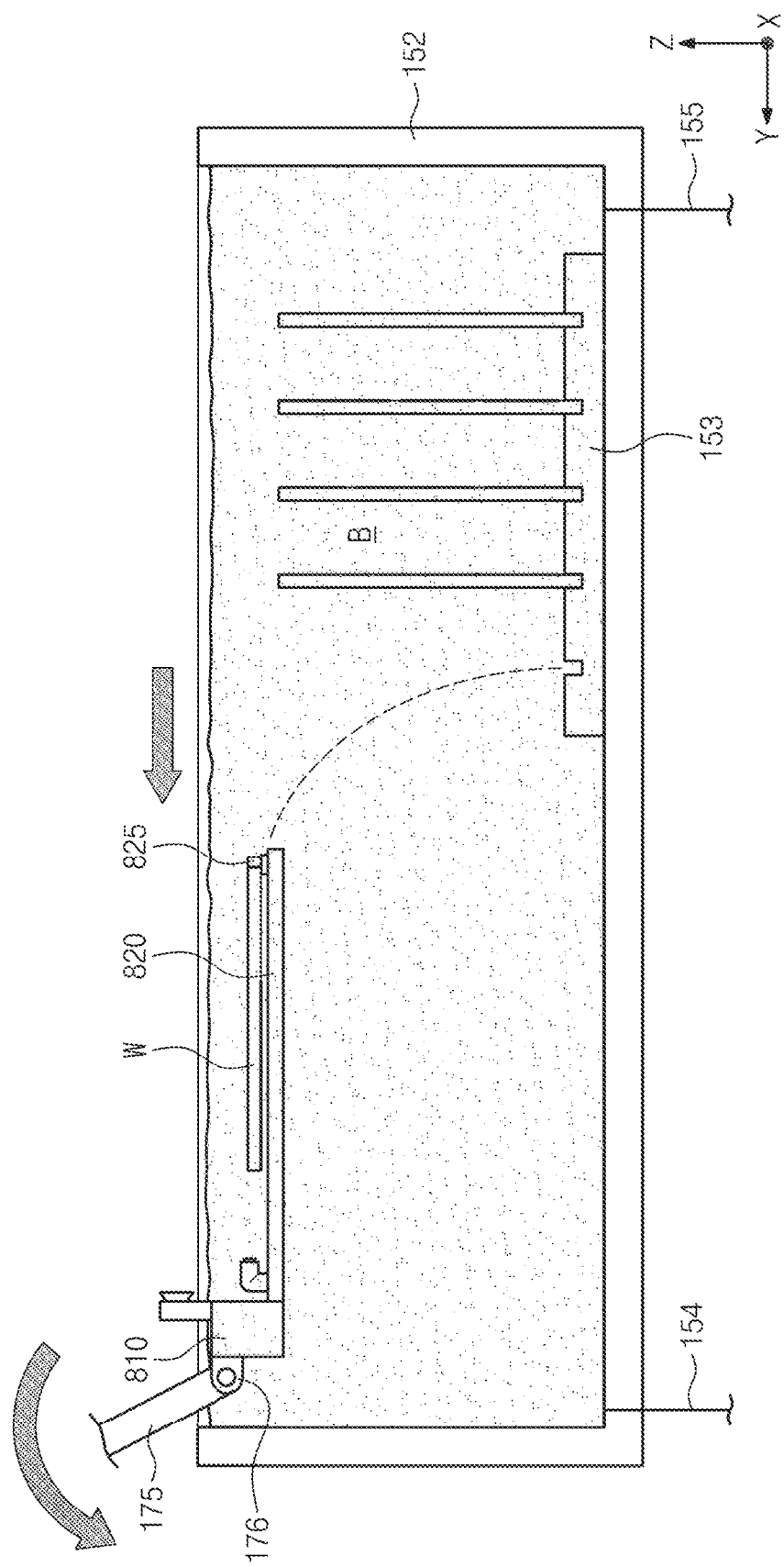

FIG. 18 and FIG. 19 are views illustrating a state in which the posture change robot changes the posture of the substrate to a horizontal posture in the second posture change step of FIG. 17.

For example, as shown in FIG. 18, in the grip step of the second posture change step S40, the hand 800 may approach any one substrate W among the substrates W supported in a second posture (vertical posture) on the support member 153. The hand 800 may be moved so that the substrate W may be positioned between the fastening body 810 and the alignment pin 825. If the substrate W is positioned between the fastening body 810 and the alignment pin 825, the gripper member 830 may move to the chucking position and grip the substrate W.

If the hand 800 grips the substrate W, the substrate W may be upwardly moved so that the substrate W may deviate from the support groove formed in the support member 153.

Then, as illustrated in FIG. 19, in the rotation step of the second posture change step S40, a position of the substrate W may be changed by linearly moving the substrate W along a direction (e.g., horizontal direction) while rotating the hand 800 based on an axis of the fourth arm 176. That is, in the rotation step, while the hand 800 of the posture change robot 156 rotates based on an axis, the hand 800 may move linearly along the horizontal direction. In this case, an end of the substrate W may be immersed in the treating liquid L while drawing a virtual curve (e.g., a cut parabola), and the posture may be changed from the vertical posture to the horizontal posture. In addition, a rotation of the substrate W may be performed in a direction in which an end of the substrate W moves away from the hand 800.

In addition, a difference between a time when the rotation of the substrate W ends and a time when a linear movement of the substrate W ends may be less than or equal to a set time. For example, these two viewpoints may be the same viewpoints. That is, if the linear movement of the substrate W ends, all rotation of the substrate W by the fourth arm 176 may end.

In addition, while the substrate W is gripped and the substrate W rotates, the vision member 870 may not be immersed in the treating liquid L. That is, the vision member 870 may be installed at a position which is not immersed in the treating liquid L stored in the posture change treating bath 151. Accordingly, it is possible to minimize a problem of the vision member 870 is being damaged by the treating liquid L.

Referring back to FIG. 17, after the second posture changing step S40 is performed, the wetting step S50 may be performed. The wetting step S50 may be performed between the second posture changing step S40 and the single-type treating step S60.

The wetting step S50 may be performed by the posture change robot 156 and/or the buffer standby 210. In the wetting step S50, a natural drying of the substrate W may be prevented by spraying the wetting liquid to the substrate W exposed to the outside away from the treating liquid L. The wetting liquid may be the same kind of liquid as the treating liquid L stored in the aforementioned posture change treating bath 151. Unlike this, the wetting liquid may be a different type of liquid from the aforementioned treating liquid.

Figure 20:
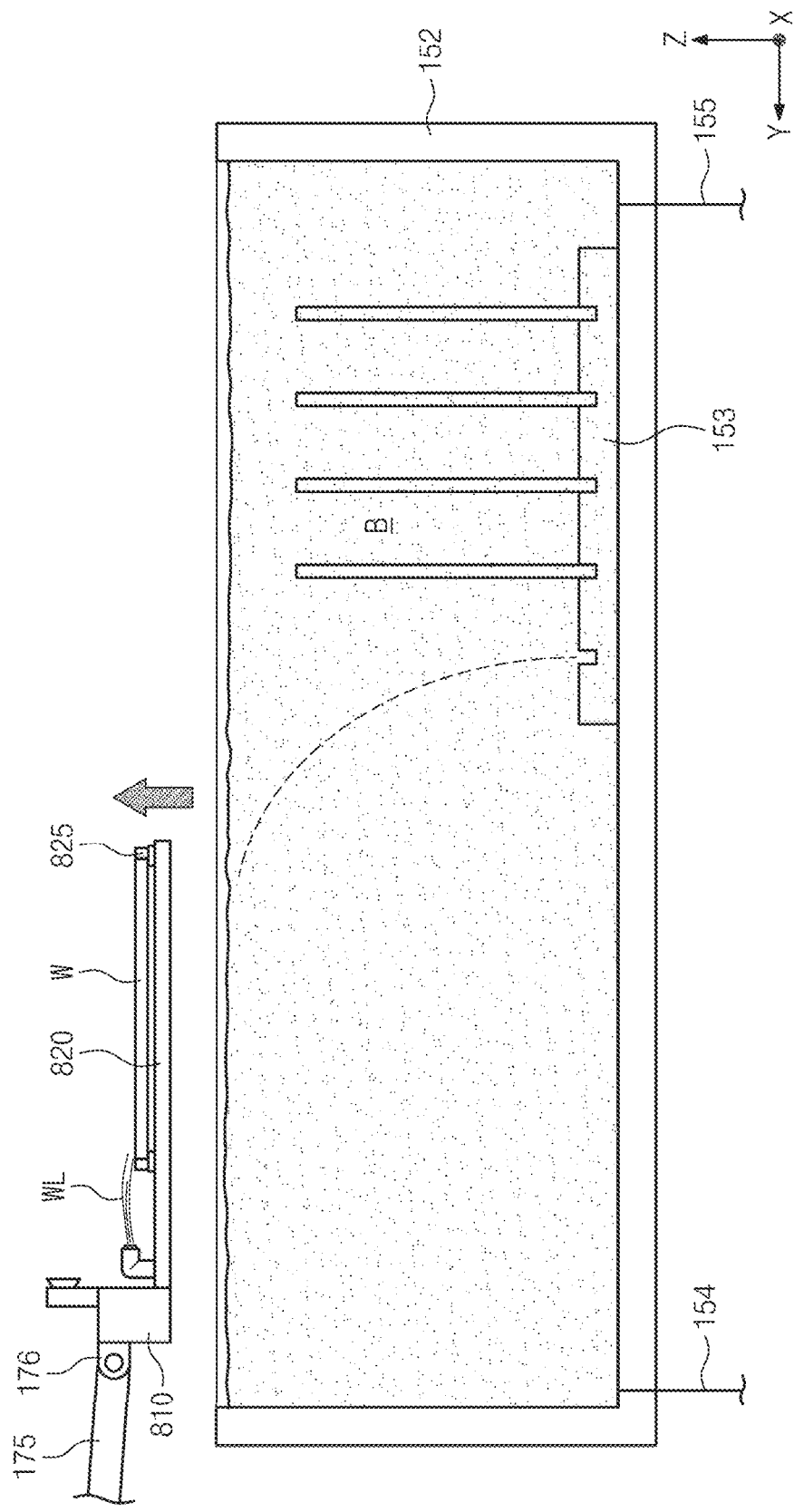
FIG. 20 illustrates the posture change robot performing a wetting step of FIG. 17.

FIG. 20 illustrates the posture change robot performing the wetting step of FIG. 17.

For example, as shown in FIG. 20, a posture change of the substrate W is completed, and the posture change robot 156 may upwardly move the substrate W so that the substrate W is separated from the treating liquid L contained in the posture change treating bath 151. If the substrate W deviates from the treating liquid L, the liquid supply member 880 may supply the wetting liquid WL. The wetting liquid WL supplied to an edge region of the substrate W may flow along a top surface of the substrate W to form a liquid film on the top surface of the substrate W. If the wetting liquid WL flows along the edge region of the substrate W to form the liquid film, a splashing phenomenon of the wetting liquid WL is suppressed as much as possible, and thus the substrate W can be treated more efficiently.

In addition, the wetting step S50 may be performed in the standby chamber 210 as described above. The posture change robot 156 transfers the substrate W to the standby chamber 210 after performing the second posture change step S40 on the substrate W. In the wetting step S50, if the substrate W is taken into the standby chamber 210, the liquid supply unit 740 may supply the wetting liquid to the substrate W.

As the wetting step S50 is performed, it is possible to minimize a natural drying of the substrate W before being taken into the single-type transfer chambers 230 and 240.

In the single-type treating step S60, a treatment may be performed on a single substrate W in a horizontal posture.

The single-type treating step S60 may include a liquid treating step S61 and a drying step S62.

In the liquid treating step S61, the substrate W may be liquid-treated in a single-type-like manner. The liquid treating step S61 may be performed in the single-type liquid treating chamber 230 if the substrate W temporarily stored in the standby chamber 210 is transferred to the single-type liquid treating chamber 230. An organic solvent such as an IPA may be supplied onto the substrate W at the liquid treating step S40.

In the drying step S62, the substrate W may be dried in a single-type manner. The drying step S62 may be performed in the drying chamber 240 if the liquid-treated substrate W in the liquid treating step S61 is transferred to the drying chamber 240. In the drying step S50, a supercritical treating fluid (e.g., supercritical carbon dioxide) may be supplied to the substrate W to remove an organic solvent, a wetting liquid, or a treating liquid L remaining on the substrate.

In some cases, the drying step S50 is not performed in the drying chamber 240, and the substrate W may be dried by rotating the substrate W at a high speed in the single-type liquid treating chamber 230 (so-called spin drying).

In the substrate unloading step S70 performed after the single-type treating step S60, the substrate W on which the single-type treating step S60 is performed may be transferred to the buffer unit 250, then transferred to the transfer container F placed on the second load port unit 270 by the second transfer robot 260 of the second transfer chamber 260, and the transfer container F placed on the second load port 270 may be gripped by a transfer apparatus such as an OHT to be unloaded from the substrate treating apparatus 10.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A substrate transfer robot for transferring a substrate comprising:
    a fastening body;
    a support body protruding to a front from the fastening body, and supporting a bottom surface of the substrate if the substrate is positioned in a first posture;
    a gripper member coupled to the fastening body and relatively movable with respect to the support body; and
    a gripper driver moving the gripper member between a first position and a second position, and
    wherein the gripper member includes:
    a first gripper positioned at a side of the support body; and
    a second gripper positioned at another side of the support body, and
    wherein an alignment pin for aligning a position of the substrate is installed at the support body, and
    if a position at which the substrate is aligned with the support body is referred to as a reference position, the first position is a position at which the first gripper and the second gripper contact a substrate positioned at the reference position to grip the substrate, and
    the second position is a position at which the first gripper and the second gripper are spaced apart from the substrate positioned at the reference position, and
    the first posture is a posture that a top surface of the substrate is horizontal to the ground.

2. The substrate transfer robot of claim 1 wherein the alignment pin upwardly protrudes from the support body at an end of the support body.

3. The substrate transfer robot of claim 2, wherein the support body includes:
    a first support; and
    a second support spaced apart from the first support, and
    wherein the first gripper, the first support, the second support, and the second gripper are sequentially aligned in a direction, and
    the alignment pin is provided at each of the first support and the second support.

4. The substrate transfer robot of claim 2, wherein the first gripper includes:
    a first side plate;
    a first support protrusion which protrudes in a direction toward the support body from the first side plate; and
    a second support protrusion which protrudes in a direction toward the support body from the first side plate, and
    wherein the second support protrusion is provided at a position which is further from the fastening body than the first support protrusion, and
    the second gripper includes:
    a second side plate;
    a third support protrusion which protrudes in a direction toward the support body from the second side plate; and
    a fourth support protrusion which protrudes in a direction toward the support body from the second side plate, and
    wherein the fourth support protrusion is further from the fastening body than the third support protrusion.

5. The substrate transfer robot of claim 4, wherein if a line which is parallel to a direction in which the support body protrudes from the fastening body and passes a center of the substrate placed at the reference position is referred to as a first reference axis,
    the first support protrusion is provided to protrude to a position closer to the first reference axis than the second support protrusion, and
    the third support protrusion is provided to protrude to a position closer to the first reference axis than the fourth support protrusion.

6. The substrate transfer robot of claim 5, wherein if a line which is vertical to the first reference axis and which is parallel to the substrate placed at the reference position and passes the center of the substrate is referred to as a second reference axis,
    the first support protrusion and the third support protrusion are positioned closer to the fastening body than the second reference axis, and
    the second support protrusion and the fourth support protrusion are positioned further from the fastening body than the second reference axis.

7. The substrate transfer robot of claim 6, wherein the first support protrusion is further from the second reference axis than the second support protrusion.

8. The substrate transfer robot of claim 7, wherein the first support protrusion and the third support protrusion are spaced apart from the second reference axis in the same distance, and
the second support protrusion and the fourth support protrusion are spaced apart from the second reference axis in the same distance.

9. The substrate transfer robot of claim 8, wherein a groove for inserting an end of the substance is formed at an end of each of the first support protrusion, the second support protrusion, the third support protrusion, and the fourth support protrusion.

10. The substrate transfer robot of claim 9, wherein the gripper driver rotates the first gripper and the second gripper so the gripper member moves between the first position and the second position, and
the second support protrusion and the fourth support protrusion contact the substrate positioned at the reference position after the first support protrusion and the third support protrusion contact the substrate positioned at the reference position.

11. The substrate transfer robot of claim 10 further comprising:
a rotation driver for rotating the fastening body so the substrate is posture changed between the first posture and a second posture, and
wherein the second posture is a posture that a top surface of the substrate is perpendicular to the ground.

12. A substrate treating apparatus comprising:
a liquid bath having a storage space for filling a liquid within;
a support unit configured to support a plurality of substrates positioned in a first posture within the storage space; and
a transfer unit configured to transfer a substrate from the support unit one at a time, and which is provided to change a posture of the substrate from the first posture to a second posture, and
wherein the first posture is a posture that a top surface of the substrate is horizontal to the ground and the second posture is a posture that a top surface of the substrate is perpendicular to the ground, and
the transfer unit includes:
a fastening body;
a support body which protrudes from the fastening body to a front and which supports a bottom surface of the substrate if substrate is positioned in the first posture;
a gripper member which is coupled the fastening body and which is relatively movable with respect to the support body;
a gripper driver which moves the gripper member between a first position and a second position, and
wherein the gripper member includes:
a first gripper positioned at a side of the support body; and
a second gripper positioned at another side of the support body, and
wherein an alignment pin for aligning a position of the substrate by upwardly protruding from an end of the support body is installed at the support body, and
if a position at which the substrate is aligned with the support body is referred to as a reference position of the substrate, the first position is a position at which the first gripper and the second gripper contact the substrate positioned at the reference position, and
the second position is a position at which the first gripper and the second gripper are spaced apart from the substrate positioned at the reference position.

13. The substrate treating apparatus of claim 12 further comprising a controller, and
wherein the controller controls the transfer unit to perform a posture change within a liquid filled within the liquid bath.

14. The substrate treating apparatus of claim 13, wherein the storage space includes a first region and a second region which are aligned with each other when seen from above, and
the plurality of substrates are supported by the support unit at the first region, and
the transfer unit changes the posture of the substrate between the first posture to the second posture at the second region.

15. The substrate treating apparatus of claim 12, wherein the support body includes:
a first support; and
a second support spaced apart from the first support, and
wherein the first gripper, the first support, the second support, and the second gripper are sequentially positioned in a direction, and
the alignment pin is provided at each of the first support and the second support, and
wherein the first gripper includes:
a first side plate;
a first support protrusion protruding in a direction toward the support body from the first side plate;
a second support protrusion protruding in a direction toward the support body from the first side plate, and
wherein the second support protrusion is provided at a position further from the fastening body than the first support protrusion, and
the second gripper includes:
a second side plate;
a third support protrusion which protrudes from the second side plate in a direction toward the support body;
a fourth support protrusion which protrudes from the second side plate in a direction toward the support body, and
the fourth support protrusion is provided at a position further from the fastening body than the third support protrusion.

16. The substrate treating apparatus of claim 15, wherein if a line which is parallel to a direction in which the support body protrudes from the fastening body and passes a center of the substrate placed at the reference position is referred to as a first reference axis,
the first support protrusion is provided to protrude to a position closer to the first reference axis than the second support protrusion, and
the third support protrusion is provided to protrude to a position closer to the first reference axis than the fourth support protrusion, and
a groove for inserting an end of the substance is formed at an end of each of the first support protrusion, the second support protrusion, the third support protrusion, and the fourth support protrusion.

17. The substrate treating apparatus of claim 16, wherein the gripper driver rotates the first gripper and the second gripper so the gripper member moves between the first position and the second position, and
the second support protrusion and the fourth support protrusion contact the substrate positioned at the reference position after the first support protrusion and the third support protrusion contact the substrate positioned at the reference position.

18. A substrate treating apparatus comprising:
a first process treating unit having a liquid treating bath for treating a plurality of substrates at once in a first posture; and
a second process treating unit having a liquid treating chamber for treating a substrate one at a time in a second posture, and
wherein the first process treating unit includes:
a liquid treating bath for liquid treating the plurality of substrates provided in the first posture by immersing in a treating liquid;
a standby bath for standing by the plurality of substrates treated in the liquid treating bath in a rinsing liquid in the first posture;
a transfer unit for transferring the plurality of substrates standing by in the standby bath one at a time to the second process treating unit, which is provided to change a posture of the substrate from the second posture to the first posture, and
wherein the first posture is a posture that a top surface of the substrate is horizontal to the ground and the second posture is a posture that a top surface of the substrate is perpendicular to the ground, and
the transfer unit includes:
a fastening body;
a support body which protrudes from the fastening body to a front and which supports a bottom surface of the substrate if substrate is positioned in the first posture;
a gripper member which is coupled the fastening body and which is relatively movable with respect to the support body;
a gripper driver which moves the gripper member between a first position and a second position, and
wherein the gripper member includes:
a first gripper positioned at a side of the support body; and
a second gripper positioned at another side of the support body, and
wherein an alignment pin for aligning a position of the substrate by upwardly protruding from an end of the support body is installed at the support body, and
if a position at which the substrate is aligned with the support body is referred to as a reference position of the substrate, the first position is a position at which the first gripper and the second gripper contact the substrate positioned at the reference position, and
the second position is a position at which the first gripper and the second gripper are spaced apart from the substrate positioned at the reference position.

19. A substrate treating apparatus of claim 18, wherein the support body includes:
a first support; and
a second support spaced apart from the first support, and
wherein the first gripper, the first support, the second support, and the second gripper are sequentially positioned in a direction, and
the alignment pin is provided at each of the first support and the second support, and
wherein the first gripper includes:
a first side plate;
a first support protrusion protruding in a direction toward the support body from the first side plate;
a second support protrusion protruding in a direction toward the support body from the first side plate, and
wherein the second support protrusion is provided at a position further from the fastening body than the first support protrusion, and
the second gripper includes:
a second side plate;
a third support protrusion which protrudes from the second side plate in a direction toward the support body;
a fourth support protrusion which protrudes from the second side plate in a direction toward the support body, and
the fourth support protrusion is provided at a position further from the fastening body than the third support protrusion.

20. The substrate treating apparatus of claim 19, wherein the gripper driver rotates the first gripper and the second gripper so the gripper member moves between the first position and the second position, and
the second support protrusion and the fourth support protrusion contact the substrate positioned at the reference position after the first support protrusion and the third support protrusion contact the substrate positioned at the reference position.

* * * * *